United States Patent
Komatsu et al.

(10) Patent No.: US 7,539,006 B2
(45) Date of Patent: *May 26, 2009

(54) ELECTROLYTIC SOLUTION FOR DRIVING ELECTROLYTIC CAPACITOR AND ELECTROLYTIC CAPACITOR

(75) Inventors: Akihiko Komatsu, Ina (JP); Tetsushi Ogawara, Ina (JP); Shigeru Uzawa, Ina (JP)

(73) Assignee: Rubycon Corporation, Nagoya (JP)

( * ) Notice: Subject to any disclaimer, the term of this patent is extended or adjusted under 35 U.S.C. 154(b) by 75 days.

This patent is subject to a terminal disclaimer.

(21) Appl. No.: 11/542,148

(22) Filed: Oct. 4, 2006

(65) Prior Publication Data

US 2007/0029529 A1 Feb. 8, 2007

Related U.S. Application Data

(62) Division of application No. 10/490,651, filed as application No. PCT/JP02/09878 on Sep. 25, 2002.

(30) Foreign Application Priority Data

Sep. 26, 2001 (JP) ............................. 2001-294783

(51) Int. Cl.
*H01G 9/02* (2006.01)
(52) U.S. Cl. ....................... 361/504; 361/500; 252/62.2
(58) Field of Classification Search ................ 252/500, 252/62.2; 361/504, 500
See application file for complete search history.

(56) References Cited

U.S. PATENT DOCUMENTS

| 4,479,167 | A | 10/1984 | Ross et al. | |
| 5,687,057 | A | 11/1997 | Dapo | |
| 6,285,543 | B1 * | 9/2001 | Komatsu et al. | 361/504 |
| 6,493,211 | B1 * | 12/2002 | Sugiyama et al. | 361/504 |

FOREIGN PATENT DOCUMENTS

| JP | 59-15374 B2 | 4/1984 |
| JP | 61-156717 A1 | 7/1986 |

(Continued)

OTHER PUBLICATIONS

International Search Report for PCT/JP02/09878 mailed Dec. 10, 2002.

(Continued)

*Primary Examiner*—Douglas Mc Ginty
*Assistant Examiner*—Tri V Nguyen
(74) *Attorney, Agent, or Firm*—Rader, Fishman & Grauer, PLLC

(57) ABSTRACT

An electrolytic capacitor using an electrolytic solution constituted by a solvent consisting of from 20 to 80 wt % of an organic solvent and from 80 to 20 wt % of water, the electrolytic capacitor comprising a nitro or nitroso compound except for nitrophenol, nitrobenzoic acid, dinitrobenzoic acid, nitrophenone and nitroanisole, in a portion inside the capacitor other than in the electrolytic solution. The electrolytic capacitor exhibits a low impedance, excellent low temperature stability and good life characteristics, and further, is excellent in the effect to absorb a hydrogen gas, even when use is made of an electrolyte solution employing mixed solvent having a great water content and when an electrolytic capacitor is used under a high temperature condition.

19 Claims, 1 Drawing Sheet

FOREIGN PATENT DOCUMENTS

| | | |
|---|---|---|
| JP | 62-145713 A1 | 6/1987 |
| JP | 62-145714 A1 | 6/1987 |
| JP | 62-145715 A1 | 6/1987 |
| JP | 63-14862 B2 | 4/1988 |
| JP | 63-250108 | 10/1988 |
| JP | 02-154411 A1 | 6/1990 |
| JP | 03-136225 | 6/1991 |
| JP | 04-010515 | 1/1992 |
| JP | 04-364017 * | 12/1992 |
| JP | 05-205978 | 8/1993 |
| JP | 09-50942 A1 | 2/1997 |
| JP | 2000-173872 A1 | 6/2000 |
| JP | 2001-185457 A1 | 7/2001 |
| JP | 2001-185458 | 7/2001 |

OTHER PUBLICATIONS

Supplementary European Search Report, for EP Application No. 02768066.9, dated May 23, 2008.

* cited by examiner

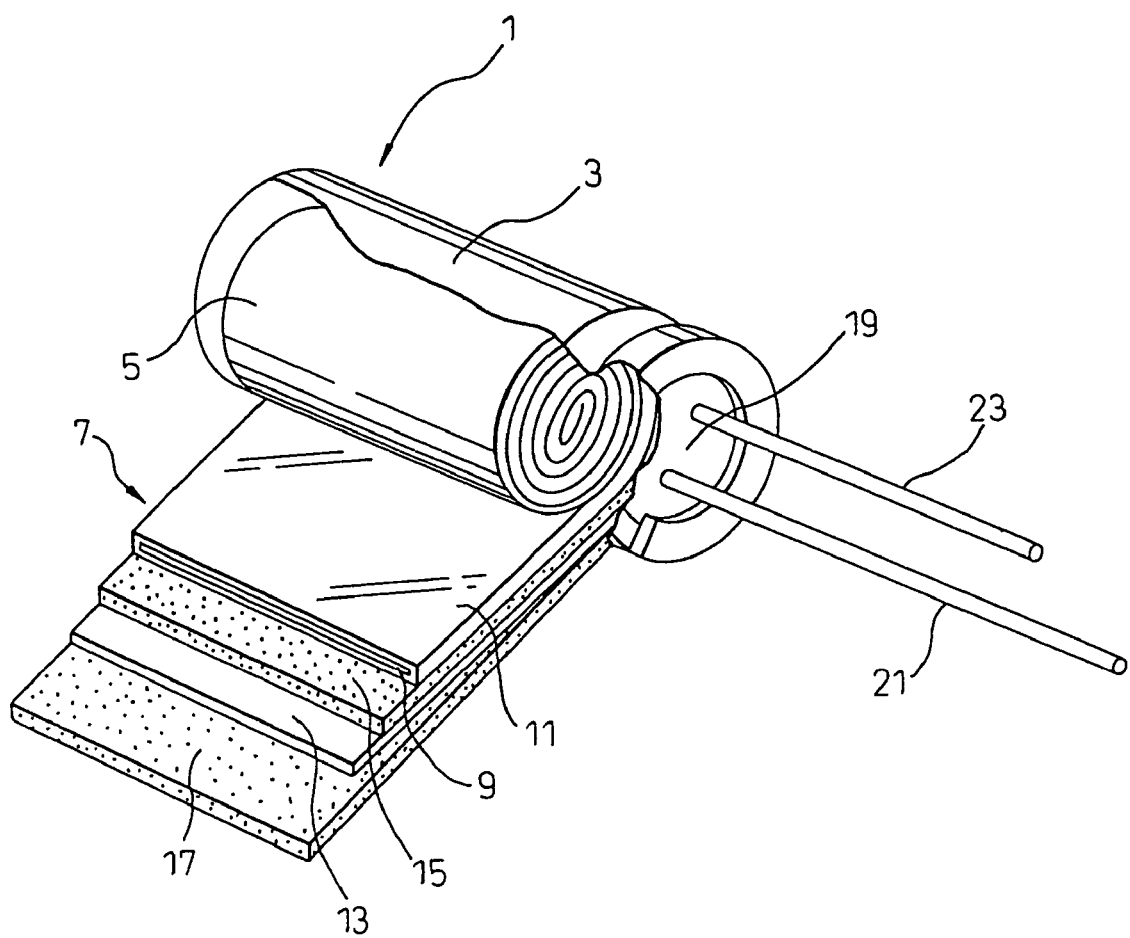

7,539,006 B2

ELECTROLYTIC SOLUTION FOR DRIVING ELECTROLYTIC CAPACITOR AND ELECTROLYTIC CAPACITOR

CROSS REFERENCE TO RELATED APPLICATIONS

The present application is a Divisional Application of patent application Ser. No. 10/490,651, filed Mar. 25, 2004, which is a national stage application of International Application No. PCT/JP02/9878 filed on Sep. 25, 2002, the entire contents of which are incorporated herein by reference.

TECHNICAL FIELD OF THE INVENTION

The present invention relates to an electrolytic capacitor, more specifically, the present invention relates to an electrolytic solution for driving an electrolytic capacitor, which ensures a low impedance, excellent low-temperature stability, reduction in the increase of pressure inside the capacitor due to a hydrogen gas generated in a high temperature environment, and good working life property, and also relates to an electrolytic capacitor and, particularly, to an aluminum electrolytic capacitor.

BACKGROUND ART

The capacitor is a general electric parts and is widely used in power source circuits or noise filters for digital circuits in various electric and electronic products. Capacitors are roughly classified into electrolytic capacitors and other capacitors (e.g., ceramic capacitors, film capacitors).

At present, various kinds of electrolytic capacitors are being used and examples thereof include aluminum electrolytic capacitors and wet tantalum electrolytic capacitors. Here, particularly excellent effects are expected from an aluminum electrolytic capacitor in the present invention and accordingly, the present invention is hereinafter described by referring to an aluminum electrolytic capacitor, however, the present invention is not limited to an aluminum electrolytic capacitor and can be widely applied to electrolytic capacitors in general.

For the electrode material of the electrolytic capacitor, a valve metal is used. In the case of an aluminum electrolytic capacitor, aluminum is used for the electrode material. The basic structure of the electrolytic capacitor takes a form (element) such that anode and cathode are prepared each by forming a predetermined amount of an oxide film as a dielectric material on the surface of an electrode (if desired, the surface area is increased by a treatment such as etching and thereby the electrostatic capacitance is controlled), these two electrodes are disposed to face each other and an electrolytic solution is held therebetween with an intervention of a separator (release paper). This electrolytic capacitor element is seal-packaged to complete an electrolytic capacitor. Some electrolytic capacitor elements have a coiled structure or have a stacked layer structure.

In the electrolytic capacitor as described above, the properties of the electrolytic solution are an important factor governing the performance of the electrolytic capacitor. Particularly, accompanying recent downsizing of the electrolytic capacitor, the anode or cathode foil used has a high etching magnification and the resistivity of the capacitor body is large. To cope with this, the electrolytic solution used therefor is always required to have low resistivity (specific resistance) and high electrical conductivity.

Heretofore, the electrolytic solution of the electrolytic capacitor was generally prepared by dissolving a carboxylic acid such as adipic acid and benzoic acid or an ammonium salt thereof as an electrolyte in a solvent consisting of ethylene glycol (EG) as the main solvent and water was added thereto to about 10 wt %. The thus-obtained electrolytic solution has a specific resistance of about 1.5 Ω·m (150 Ω·cm).

On the other hand, a capacitor is required to have a low impedance (Z) so as to satisfactorily provide a suitable performance. The impedance is determined by various factors. For example, the impedance decreases when the electrode area of the capacitor is increased and therefore, in a large-size capacitor, a low impedance is naturally obtained. Also, there is an approach of attaining a low impedance by improving the separator. However, and particularly in a small-size capacitor, the specific resistance of the electrolytic solution is a large factor governing the impedance.

In recent years, an electrolytic solution having a low specific resistance and using an aprotic organic solvent such as GBL (γ-butyrolactone) has been developed (see, for example, Japanese Unexamined Patent Publication (Kokai) Nos. 62-145713, 62-145714 and 62-145715). However, the capacitor using the aprotic electrolytic solution is by far inferior in impedance to a solid capacitor using an electronic conductor having a specific resistance of 1.0 Ω·cm or less.

An aluminum electrolytic capacitor uses an electrolytic solution and therefore, is poor in low-temperature properties. In fact, the ratio Z (−40° C.)/Z (20° C.) of the impedance at −40° C. at 100 kHz to the impedance at 20° C. is about 40 and fairly large. Under these circumstances, an aluminum electrolytic capacitor having a low impedance, a low specific resistance and excellent low-temperature stability is required at present.

Water used as one portion of the solvent in the electrolytic solution of the aluminum electrolytic capacitor is chemically active with the aluminum constituting the anode or cathode foil and this causes a problem that water reacts with the anode or cathode foil to generate a hydrogen gas. As a result, the pressure inside the capacitor is increased, stress is imposed to the capacitor element, the coil structure is deformed or broken, the electrolytic solution is splashed outside, the safety vent is actuated, and the properties are seriously deteriorated. Conventionally, an attempt to absorb the generated hydrogen gas has been made so as to eliminate the problem of hydrogen gas generated in a load test or the like of the electrolytic capacitor. For example, Japanese Examined Patent Publication (Kokoku) No. 59-15374 discloses an electrolytic solution for driving an electrolytic capacitor, characterized in that a carboxylic acid and an ammonium salt of carboxylic acid are added to a solvent obtained by adding from 5 to 20 wt % of water to ethylene glycol and to the prepared buffer solution, from 0.05 to 3 wt % of p-nitrophenol is added to prepare the electrolytic solution. When this electrolytic solution is used, an electrolytic capacitor protected from the production of boehmite or the generation of hydrogen gas and improved in the low-temperature stability and working life properties can be provided.

Furthermore, Japanese Examined Patent Publication (Kokoku) No. 63-14862 discloses an electrolytic solution for driving an electrolytic capacitor, which can provide an excellent anticorrosive effect for cleaning with a halogenated hydrocarbon, characterized in that o-nitroanisole is added to an electrolytic solution obtained by dissolving an organic or inorganic acid of various types or a salt thereof as a solute in a solvent mainly comprising ethylene glycol. This patent publication states that the o-nitroanisole used as an anticorrosive has an activity of absorbing hydrogen gas and provides an effect of absorbing hydrogen gas generated from the inside of the electrolytic capacitor during use and thereby preventing an accidental safety-vent operation or a change in the electrostatic capacitance.

However, according to the studies by the present inventors, it is found that although the p-nitrophenol or o-nitroanisole can provide an effect of absorbing hydrogen gas, at an initial stage, in an electrolytic solution for driving an electrolytic capacitor, is commonly used and has a low water concentration, a sufficiently high effect of absorbing hydrogen gas cannot be obtained and cannot be maintained when the amount of water in the solvent of the electrolytic solution is 20 wt % or more or when the electrolytic capacitor is used over a long period of time in a high-temperature environment.

The present invention has been made to solve those problems in conventional techniques and an object of the present invention is to provide an electrolytic solution for driving an electrolytic capacitor, which ensures low impedance, has an excellent low-temperature stability represented by the ratio of impedance between low temperature and ordinary temperature, has a good working life property and has a capability of providing an excellent hydrogen gas-absorbing effect even when an electrolytic solution using a mixed solvent having a large water content ratio is used or when the electrolytic capacitor is used in a high-temperature environment. The object of the present invention includes providing an electrolytic capacitor using the electrolytic solution.

Another object of the present invention is to provide an electrolytic capacitor using a driving electrolytic solution having a solvent composition with 30 wt % or more thereof being water, wherein a solvent-soluble nitro compound or nitroso compound is contained in the capacitor element.

DISCLOSURE OF THE INVENTION

In one aspect, the present invention provides an electrolytic solution for driving an electrolytic capacitor, comprising a solvent consisting of from 20 to 80 wt % of an organic solvent and from 80 to 20 wt % of water, which contains at least one nitro or nitroso compound except for nitrophenol, nitrobenzoic acid, dinitrobenzoic acid, nitroacetophenone and nitroanisole.

The present inventors have previously disclosed in Japanese unexamined Patent Publication (Kokai) No. 2000-173872 an electrolytic solution for driving an electrolytic capacitor, comprising a solvent consisting of from 20 to 80 wt % of an organic solvent and from 80 to 20 wt % of water, which contains nitrophenol, nitrobenzoic acid, dinitrobenzoic acid, nitroacetophenone or nitroanisole, and by this means, the above-described objects can be attained. Thereafter, studies have been continuously made and, as a result, it has been confirmed that the above-described objects can be similarly attained not only by those specific compounds but also by other nitro or nitroso compounds, those specific compounds previously disclosed are not necessarily excellent on taking account of the use conditions of the electrolytic capacitor, and an effect similar to or more excellent than the effect by those previously disclosed specific compounds can be provided using compounds including those deemed inferior in the performance to the previously disclosed specific compounds by appropriately selecting the organic solvent or designing the form of the compound present inside the electrolytic capacitor or by combining two or more thereof. Based on these findings, the present invention has been accomplished.

In the electrolytic solution for driving an electrolytic capacitor of the present invention, the nitro or nitroso compound is considered to act and provide an effect as follows.

The hydrogen gas generated, by the hydration reaction between the aluminum electrode foil and water as the solvent, increases the pressure inside the capacitor to impose a stress on the capacitor element and this causes various phenomena and seriously deteriorates the properties of the capacitor, for example, deforming or breaking the structure of the element, promoting the splashing of the electrolytic solution outside or actuating the safety vent. The nitro or nitroso compound acts to prevent these phenomena. The nitro or nitroso compound efficiently absorbs hydrogen generated inside the capacitor and prevents the capacitor from deteriorating in properties. This process is a chemical reaction and a reduction reaction.

The absorption of hydrogen, which prevents the increase of pressure inside the capacitor, takes place at the chemical reaction of reducing the nitro group of the nitro compound into an amino group. The nitro compound consumes hydrogen to change into a nitroso compound and further consumes hydrogen to change into an amino compound. As for the absorption of hydrogen, the nitroso group has the same reaction mechanism as the nitro group and changes into an amino group. However, important here are the hydrogen-absorbing ability of the compound and the fact that the nitro or nitroso compound is present (dissolved or dispersed) in the distributed state in the electrolytic solution. The nitro compound reacts with hydrogen and first changes into a nitroso compound. Many nitro compounds become insoluble in the electrolytic solution when the nitro group changes into a nitroso group, and have a tendency to locally deposit inside the capacitor element. Another substituent within the compound acting to render the nitro compound soluble in a solvent is affected and this is also responsible for the tendency. However, there is a nitroso group soluble in a solvent.

The nitroso group is not so high in the reactivity with hydrogen as compared with the nitro group and some nitroso groups resulting from the reduction of nitro group are deposited and localized and become physically poor in the reaction with hydrogen. However, the nitroso compound is far higher in the hydrogen-absorbing ability than other substances and can be satisfactorily used in practice. When a nitroso compound soluble in a solvent is used, the nitroso compound can be uniformly present in the electrolytic solution to provide a good dissolved state similarly to the nitro compound, whereby the hydrogen gas generated is efficiently absorbed and good capacitor properties are maintained. In order to obtain a more outstanding effect, two or more nitro or nitroso compounds are preferably used in combination. By making use of a difference in the reduction reaction rate of those nitro or nitroso compounds, the absorption of hydrogen can be continued for a long period of time and the properties of the capacitor can be stabilized. In the case of using a nitro or nitroso compound by adding it to the electrolytic solution of the present invention, the nitro or nitroso compound is preferably added in an amount of 0.01 to 5 wt % based on the entire amount of the electrolytic solution. Even when one nitro or nitroso compound is used, an excellent hydrogen-absorbing effect can be provided by combining it with other electrolytic components.

The organic solvent used in combination with water for forming a mixed solvent is preferably a protonic Solvent, an aprotic solvent or a mixture thereof. More specifically, a protonic solvent and an aprotic solvent each may be used alone or, if desired, two or more thereof may be used in an arbitrary combination. The protonic solvent is preferably an alcohol compound and the aprotic solvent is preferably a lactone compound or the like.

The carboxylic acid or a salt thereof which can be used as the electrolyte in the electrolytic solution of the present invention is preferably one or more member selected from the group consisting of a monocarboxylic acid, a dicarboxylic acid, a tricarboxylic acid, a carboxylic acid having a functional group such as hydroxyl group, a saturated carboxylic acid and an unsaturated carboxylic acid, represented by formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, derivatives thereof and their ammonium salts, sodium salts, potassium salts, amine salts and alkylammonium salts. The carboxylic acid or a salt thereof is preferably a formic acid, an acetic acid, a p-nitrobenzoic acid, a salicylic acid, an oxalic acid, a malonic acid, a fumaric acid, a maleic acid, a phthalic acid, a citric acid, a sulfamic acid, an ethylenediaminetetraacetic acid, or an ammonium, sodium, potassium, amine or alkylammonium salts thereof, more preferably a formic acid.

The inorganic acid or a salt thereof which can be used as the electrolyte is preferably one or more member selected from the group consisting of an inorganic acid represented by phosphoric acid, phosphorous acid, hypophosphorous acid, boric acid, sulfamic acid and alkylphosphoric acid, an inorganic acid having a carbon chain such as alkyl group, and their ammonium salts, sodium salts, potassium salts, amine salts and alkylammonium salts.

The electrolytic solution of the present invention preferably contains a carboxylic acid in combination with an inorganic acid selected from a phosphoric acid, a phosphorous acid, a boric acid, a hypophosphorous acid, a sulfamic acid and an alkylphosphoric acid and, particularly, from a phosphoric acid, a phosphorous acid and a boric acid.

In addition to the nitro or nitroso compound, the electrolyte for use in the present invention may contain, if desired, an additive selected from the group consisting of:

(1) a chelate compound, (2) saccharides, (3) a hydroxybenzyl alcohol and(or) an L-glutamic-diacetic acid or a salt thereof and (4) a gluconic acid and(or) a gluconic lactone. These additives may be used individually, or two or more additives may be used in an arbitrary combination.

The electrolytic solution for driving an electrolytic capacitor of the present invention can have a specific resistance of 68 Ωcm or less, preferably 40 Ωcm or less, more preferably 30 Ωcm or less.

In another aspect of the present invention, as a result of further continuing studies based on the above-described experimental results and knowledge, it has been found that in an electrolytic capacitor comprising an electrolytic solution containing a solvent consisting of 20 to 80 wt % of an organic solvent and from 80 to 20 wt % of water, the nitro or nitroso compound is not necessarily required to be present in the electrolytic solution but the objects can be similarly attained by constructing the capacitor to contain the nitro or nitroso compound in a portion inside the capacitor other than in the electrolytic solution and an additional effect is provided by constructing the capacitor to contain the nitro or nitroso compound both in the electrolytic solution and in a portion inside the capacitor other than in the electrolytic solution.

For example, even when the nitro or nitroso compound is not present in the electrolytic solution but is present in the physical hydrogen-generating site, namely, on the electrode foil surface or in the vicinity thereof, or in the state of being uniformly contained in a separator, the nitro or nitroso compound satisfactorily exerts the hydrogen-absorbing effect.

That is, the present invention provides the following:

(1) an electrolytic solution for driving an electrolytic capacitor, comprising a solvent consisting of from 20 to 80 wt % of an organic solvent and from 80 to 20 wt % of water, which contains one or more nitro or nitroso compound except for nitrophenol, nitrobenzoic acid, dinitrobenzoic acid, nitroacetophenone and nitroanisole;

(2) the electrolytic solution for driving an electrolytic capacitor as described in (1) above, wherein the nitro or nitroso compound is soluble in water, a polar solvent or a protonic polar organic solvent;

(3) the electrolytic solution for driving an electrolytic capacitor as described (1) and (2) above, which comprises at least one electrolyte selected from the group consisting of a carboxylic acid or a salt thereof, and an inorganic acid or a salt thereof;

(4) the electrolytic solution for driving an electrolytic capacitor as described in (1) to (3) above, wherein the nitro or nitroso compound is aminonitroanisole, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)-ethanamine, O-ethyl-O-(p-nitrophenyl) thionobenzene, ethylnitrobenzene, ethyl-2-(hydroxyimino)-5-nitro-3-hexeneamide, octanitrobenzoylsaccharose, nitrophenyloctyl ether, nitrophenyl galactopyranoside, 3-carboxy-4-nitrophenyl disulfide, bisnitrobenzylfluorescein, glycerol carbonatenitrobenzene sulfonate, glutamyl nitroanilide, nitrophenyl acetate, nitrobenzylidene acetate, diaminonitrobenzene, dithiobisnitrobenzoic acid, dithiobisnitropyridine, dinitroaniline, dinitroquinoxaline-2,3-dione, dinitrosalicylic acid, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzaldehyde, dinitrobenzoylmethylbenzylamine, dinitrobenzophenone, nitroaminothiazole, dimethylnitroaniline, dimethylnitrophenylphosphorothioate, dimethoxynitrobenzyl alcohol, bisdinitrophenyl oxalate, succinimidyl nitrophenylacetate, tetranitrophenyl porphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazinemaleic acid, nitrocresol, nitrocinnamic acid, nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphthol, nitrophenylazomethylresorcinol, nitrophenylaniline, nitrophenyloctyl ether, nitrophenylgalactopyranoside, nitrophenylxylopyranoside, nitrophenylglucuronide, nitrophenylglucopyranoside, nitrophenylacetic acid, nitrophenyldodecyl ether, nitrophenylarsonic acid, nitrophenylhydrazine, nitrophenylphenylazdphenyl triazene, nitrophenylphenyl ether, nitrophenyl maltopentaoside, nitrophenylmannopyranoside, nitrophenylbutyric acid, diethyl nitrophenylphosphate, nitrophenylenediamine, nitrophenethole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridine, nitrobenzamide, nitrobenzimidazole, nitrobenzohydrazide, nitrobenzeneazoorcinol, nitrobenzeneazonaphthol, nitromethane, nitroethane, nitrobenzeneazoresorcinol, nitrobenzenesulfonic acid, nitrobenzocoumarin, nitrobenzonitrile, nitrobenzophenone, nitromesitylene, nitromethoxyaniline, bisnitrophenyl disulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, 3-[2-hydroxy-1-(1-methylethyl)-2-nitrosohydrazino]-1-propanonamine, phenylnitroaniline, 2-(2-furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitroso oxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenylhydroxylamine ammonium, nitrosophenol, N-[(N-nitrosomethylamino)methyl]benzamide, 2,2'-(hydroxynitrosohydrazono)bisethanamine, N-methyl-2-(1-ethyl-2-hydroxy-2-nitrosohydrazino)-ethanamine, N,N'-dinitroso-p-phenylenediamine, N,N'-dinitrosopentamethylenetetramine, dimethylnitrosoaniline, dimethylnitrosoamine, nitrosonium tetrafluoroborate, N-[N'-methyl-N'-nitroso(aminomethyl)]benzamide, N-methyl-N-nitroso-p-toluenesulfonamide, nitrobenzene, dinitrobenzene, dinitrotoluene, nitronaphthalene, dinitronaphthalene, dinitrobiphenyl, dimethylnitrotoluene, dinitropyrene, nitrobenzoic acid ester, dimethylnitrobenzene, nitroanthracene, nitroisoquinoline, nitroxylene, ethyl nitroacetate, nitrocyclopentane, nitrostyrene, nitropyrrole, nitrofurazone, nitrofuraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene, fluoronitrodiphenyl ether, trinitroacetonitrile, trinitroaniline, trinitrobenzoic acid, trinitroethane, trinitroxylene, trinitrotoluene, trinitronaphthalene, trinitrofluorenone, trinitrobenzene, trinitromesitylene, trinitromethane, trinitroresorcinol, dinitroacetanilide, dinitroanisole, dinitroanthraquinone, dinitroethane, dinitroethanediamine, dinitrocarbanilide, dinitroxylene, dinitroglycerol, dinitrocresol, dinitronaphthol, dinitrophenyl, dinitrophenylhydrazone, dinitromethane, dinitroresorcinol, nitroamide, nitroanthraquinone, nitroisophthalic acid, nitroethylene, ethyl nitrocarbamate, nitroquinaldic acid, nitroguanidine, nitroglycol, nitroglycerin, nitrodimethylamine, nitrocamphor, methylnitropropane, nitrosulfathiazole, nitrocellulose, nitrosomethane, nitrosoguanidine, nitrosodimethylaniline, nitrosotoluene, nitrosodisulfonic acid, nitrosopiperidine, nitrosobenzene, nitrosomethylurea, nitronaphthylamine, nitronaphthol, nitropyridine, nitrophenanthrene, nitrophenylpropiolic acid, nitrophenetidine, nitrophenolsulfonic acid, nitropentane, nitroresorcinol, nitrourea, trinitroxylenol, trinitrodiphenyl ether, trinitrotriazidobenzene, trinitrophloroglucinol, nitroacridine, nitroacridone, nitroacetone, nitroanilic acid, nitroaminoacetic acid, nitroisatin, nitroisobutane, nitroindene, nitrourethane, nitrocarbostyril, nitrodiglycol, nitro-p-cymene, nitrocinnamaldehyde, N-nitrosoacetanilide, nitrosoanisidine, nitrosoaniline, nitrosobenzoic acid, nitrosoanthranilic acid, nitrosocatechol, nitrosocarvacrol, nitrosocresol, nitrosonaphthylamine, nitrothioanisole, nitrothiophenol, nitronaphthalenesulfonic acid, nitronaphthylamine, nitronaphthoic acid, nitronitrosobenzene, nitrohydroquinone, nitropyrogallol, nitrophenanthridine, nitrophenanthroline, nitrophenylurethane, nitrophenylurea, nitrobutane, nitrophthalide, nitrofuran, nitropropylene, nitrophloroglucinol, nitrobenzanilide, nitrobenzaldoxime, nitrobenzoylformic acid, nitrobenzimidazole, nitromalonic acid, nitromalondialdehyde, nitromandelic acid, nitromannitol, nitromethylnaphthalene, nitromalic acid, nitroresorcinol, nitron, nitrosoresorcinol, aminonitropyrimidine, trinitrofluorenylidene malononitrile, nitrofluoranthene, nitrobenzocrown, fluoronitrobenzofurazan, methylnitronitrosoguanidine, methylnitronitrophenylpyrazolone, nitrofluorene, nitropropane, nitropropoxyaniline, trinitroanisole, trinitrocresol, trinitrobenzaldehyde, nitrodiethylaniline, nitrostilbene, nitrosonaphthalene, nitrosobenzaldehyde, nitrosomethylurethane, nitrophenylhydrazone, dinitrotartaric acid, dinitrostilbene, dinitrosoresorcinol, dinitrohydroquinone, dinitroresorcinol, nitroquinoline, dinitrosophenol, trinitrosophenol, dinitrosobenzoic acid, trinitrosobenzoic acid, dinitroacetophenone, trinitroacetophenone, nitrosoacetophenone, dinitrosoacetophenone, trinitrosoacetophenone, nitrosoanisole, dinitrosoanisole, trinitrosoanisole or an isomer, salt, derivative, coordinate bonded form or clathrate form thereof;

(5) the electrolytic solution for driving an electrolytic capacitor as described in (1) to (4) above, wherein the nitro or nitroso compounds are used in combination of two or more thereof;

(6) the electrolytic solution for driving an electrolytic capacitor as described in (1) to (5) above, wherein the nitro or nitroso compound is contained in an amount of 0.01 to 5 wt % based on the entire amount of the electrolytic solution;

(7) the electrolytic solution for driving an electrolytic capacitor as described in (6) above, which additionally contains from 0.01 to 10% of a salt or derivative of nitrophenol, nitrobenzoic acid, dinitrobenzoic acid, nitroacetophenone and nitroanisole;

(8) the electrolytic solution for driving an electrolytic capacitor as described in (1) to (7) above, wherein the organic solvent is a protonic solvent, an aprotic solvent or a mixture thereof;

(9) the electrolytic solution for driving an electrolytic capacitor as described in (3) to (8) above, wherein the carboxylic acid or a salt thereof is selected from the group consisting of a monocarboxylic acid, a dicarboxylic acid, a tricarboxylic acid, a saturated carboxylic acid and an unsaturated carboxylic acid, represented by formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, derivatives thereof, and their ammonium salt, sodium salt, potassium salt, amine salt and alkylammonium salt;

(10) the electrolytic solution for driving an electrolytic capacitor as described in (3) to (8) above, wherein the carboxylic acid or a salt thereof is selected from the group consisting of a formic acid, an acetic acid, a p-nitrobenzoic acid, a salicylic acid, an oxalic acid, a malonic acid, a fumaric acid, a maleic acid, a phthalic acid, a citric acid, a sulfamic acid, an ethylenediaminetetraacetic acid, and their ammonium salt, sodium salt, potassium salt, amine salt and alkylammonium salt;

(11) the electrolytic solution for driving an electrolytic capacitor as described in (3) to (8) above, wherein the carboxylic acid or a salt thereof is a formic acid;

(12) the electrolytic solution for driving an electrolytic capacitor as described in (3) to (8) above, wherein the inorganic acid or a salt thereof is selected from the group consisting of an inorganic acid represented by phosphoric acid, phosphorous acid, hypophosphorous acid, boric acid, sulfamic acid and alkylphosphoric acid, an inorganic acid having a carbon chain such as alkyl group, and their ammonium salts, sodium salts, potassium salts, amine salts and alkylammonium salts;

(13) the electrolytic solution for driving an electrolytic capacitor as described in (3) to (11) above, which comprises a combination of the carboxylic acid or a salt thereof and at least one inorganic acid selected from a phosphoric acid, a phosphorous acid, a boric acid, a hypophosphorous acid, a sulfamic acid and an alkylphosphoric acid;

(14) the electrolytic solution for driving an electrolytic capacitor as described in (1) to (13) above, which further comprises at least one compound selected from the group consisting of (1) a chelate compound, (2) saccharides, (3) a hydroxybenzyl alcohol and(or) an L-glutamic-diacetic acid or a salt thereof and (4) a gluconic acid and(or) a gluconic lactone;

(15) the electrolytic solution for driving an electrolytic capacitor as described in (1) to (14) above, wherein the solvent consists of 20 to 55 wt % of an organic solvent and 80 to 45 wt % of water;

(16) the electrolytic solution for driving an electrolytic capacitor as described in (15) above, wherein the solvent consists of 20 to 35 wt % of an organic solvent and 80 to 65 wt % of water;

(17) the electrolytic solution for driving an electrolytic capacitor as described in (1) to (16) above, wherein the specific resistance of the electrolytic solution is 68 Ωcm or less;

(18) the electrolytic solution for driving an electrolytic capacitor as described in (1) to (16) above, wherein the specific resistance of the electrolytic solution is 40 Ωcm or less;

(19) the electrolytic solution for driving an electrolytic capacitor as described in (1) to (16) above, wherein the specific resistance of the electrolytic solution is 30 Ωcm or less;

(20) an electrolytic capacitor comprising the electrolytic solution for driving an electrolytic capacitor described in (1) to (19);

(21) an electrolytic capacitor using an electrolytic solution constituted by a solvent consisting of from 20 to 80 wt % of an organic solvent and from 80 to 20 wt % of water, the electrolytic capacitor comprising a nitro or nitroso compound except for nitrophenol, nitrobenzoic acid, dinitrobenzoic acid, nitrophenone and nitroanisole, in a portion inside the capacitor other than in the electrolytic solution;

(22) the electrolytic capacitor as described in (21) above, wherein the nitro or nitroso compound is aminonitroanisole, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)-ethanamine, O-ethyl-O-(p-nitrophenyl) thionobenzene, ethylnitrobenzene, ethyl-2-(hydroxyimino)-5-nitro-3-hexeneamide, octanitrobenzoylsaccharose, nitrophenyloctyl ether, nitrophenyl galactopyranoside, 3-carboxy-4-nitrophenyl disulfide, bisnitrobenzylfluorescein, glycerol carbonatenitrobenzene sulfonate, glutamyl nitroanilide, nitrophenyl acetate, nitrobenzylidene acetate, diaminonitrobenzene, dithiobisnitrobenzoic acid, dithiobisnitropyridine, dinitroaniline, dinitroquinoxaline-2,3-dione, dinitrosalicylic acid, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzaldehyde, dinitrobenzoylmethylbenzylamine, dinitrobenzophenone, nitroaminothiazole, dimethylnitroaniline, dimethylnitrophenylphosphorothioate, dimethoxynitrobenzyl alcohol, bisdinitrophenyl oxalate, succinimidyl nitrophenylacetate, tetranitrophenyl porphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazinemaleic acid, nitrocresol, nitrocinnamic acid, nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphthol, nitrophenylazomethylresorcinol, nitrophenylaniline, nitrophenyloctyl ether, nitrophenylgalactopyranoside, nitrophenylxylopyranoside, nitrophenylglucuronide, nitrophenylglucopyranoside, nitrophenylacetic acid, nitrophenyldodecyl ether, nitrophenylarsonic acid, nitrophenylhydrazine, nitrophenylphenylazophenyl triazene, nitrophenylphenyl ether, nitrophenylmaltopentaoside, nitrophenylmannopyranoside, nitrophenylbutyric acid, diethyl nitrophenylphosphate, nitrophenylenediamine, nitrophenethole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridine, nitrobenzamide, nitrobenzimidazole, nitrobenzohydrazide, nitrobenzeneazoorcinol, nitrobenzeneazonaphthol, nitromethane, nitroethane, nitrobenzeneazoresorcinol, nitrobenzenesulfonic acid, nitrobenzocoumarin, nitrobenzonitrile, nitrobenzophenone, nitromesitylene, nitromethoxyaniline, bisnitrophenyl disulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, 3-[2-hydroxy-1-(1-methylethyl)-2-nitrosohydrazino]-1-propanonamine, phenylnitroaniline, 2-(2-furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitroso oxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenylhydroxylamine ammonium, nitrosophenol, N-[(N-nitrosomethylamino)methyl]benzamide, 2,2'-(hydroxynitrosohydrazono)bisethanamine, N-methyl-2-(1-ethyl-2-hydroxy-2-nitrosohydrazino)-ethanamine, N,N'-dinitroso-p-phenylenediamine, N,N'-dinitrosopentamethylenetetramine, dimethylnitrosoaniline, dimethylnitrosoamine, nitrosonium tetrafluoroborate, N-[N'-methyl-N'-nitroso(aminomethyl)]benzamide, N-methyl-N-nitroso-p-toluenesulfonamide, nitrophenol, nitrobenzoic acid, dinitrobenzoic acid, nitroacetophenone, nitroanisole, nitrobenzene, dinitrobenzene, dinitrotoluene, nitronaphthalene, dinitronaphthalene, dinitrobiphenyl, dimethylnitrotoluene, dinitropyrene, nitrobenzoic acid ester, dimethylnitrobenzene, nitroanthracene, nitroisoquinoline, nitroxylene, ethyl nitroacetate, nitrocyclopentane, nitrostyrene, nitropyrrole, nitrofurazone, nitrofuraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene, fluoronitrodiphenyl ether, trinitroacetonitrile, trinitroaniline, trinitrobenzoic acid, trinitroethane, trinitroxylene, trinitrotoluene, trinitronaphthalene, trinitrofluorenone, trinitrobenzene, trinitromesitylene, trinitromethane, trinitroresorcinol, dinitroacetanilide, dinitroanisole, dinitroanthraquinone, dinitroethane, dinitroethanediamine, dinitrocarbanilide, dinitroxylene, dinitroglycerol, dinitrocresol, dinitronaphthol, dinitrophenyl, dinitrophenylhydrazone, dinitromethane, dinitroresorcinol, nitroamide, nitroanthraquinone, nitroisophthalic acid, nitroethylene, ethyl nitrocarbamate, nitroquinaldic acid, nitroguanidine, nitroglycol, nitroglycerin, nitrodimethylamine, nitrocamphor, methylnitropropane, nitrosulfathiazole, nitrocellulose, nitrosomethane, nitrosoguanidine, nitrosodimethylaniline, nitrosotoluene, nitrosodisulfonic acid, nitrosopiperidine, nitrosobenzene, nitrosomethylurea, nitronaphthylamine, nitronaphthol, nitropyridine, nitrophenanthrene, nitrophenylpropiolic acid, nitrophenetidine, nitrophenolsulfonic acid, nitropentane, nitroresorcinol, nitrourea, trinitroxylenol, trinitrodiphenyl ether, trinitrotriazidobenzene, trinitrophloroglucinol, nitroacridine, nitroacridone, nitroacetone, nitroanilic acid, nitroaminoacetic acid, nitroisatin, nitroisobutane, nitroindene, nitrourethane, nitrocarbostyril, nitrodiglycol, nitro-p-cymene, nitrocinnamaldehyde, N-nitrosoacetanilide, nitrosoanisidine, nitrosoaniline, nitrosobenzoic acid, nitrosoanthranilic acid, nitrosocatechol, nitrosocarvacrol, nitrosocresol, nitrosonaphthylamine, nitrothioanisole, nitrothiophenol, nitronaphthalenesulfonic acid, nitronaphthylamine, nitronaphthoic acid, nitronitrosobenzene, nitrohydroquinone, nitropyrogallol, nitrophenanthridine, nitrophenanthroline, nitrophenylurethane, nitrophenylurea, nitrobutane, nitrophthalide, nitrofuran, nitropropylene, nitrophloroglucinol, nitrobenzanilide, nitrobenzaldoxime, nitrobenzoylformic acid, nitrobenzimidazole, nitromalonic acid, nitromalondialdehyde, nitromandelic acid, nitromannitol, nitromethylnaphthalene, nitromalic acid, nitroresorcinol, nitron, nitrosoresorcinol, aminonitropyrimidine, trinitrofluorenylidene malononitrile, nitrofluoranthene, nitrobenzocrown, fluoronitrobenzofurazan, methylnitronitrosoguanidine, methylnitronitrophenylpyrazolone, nitrofluorene, nitropropane, nitropropoxyaniline, trinitroanisole, trinitrocresol, trinitrobenzaldehyde, nitrodiethylaniline, nitrostilbene, nitrosonaphthalene, nitrosobenzaldehyde, nitrosomethylurethane, nitrophenylhydrazone, dinitrotartaric acid, dinitrostilbene, dinitrosoresorcinol, dinitrohydroquinone, dinitroresorcinol, nitroquinoline, dinitrosophenol, trinitrosophenol, dinitrosobenzoic acid, trinitrosobenzoic acid, dinitroacetophenone, trinitroacetophenone, nitrosoacetophenone, dinitrosoacetophenone, trinitrosoacetophenone, nitrosoanisole, dinitrosoanisole, trinitrosoanisole or an isomer, salt, derivative, coordinate bonded form or clathrate form thereof; (23) the electrolytic capacitor as described in (21) and (22) above, which comprises the nitro or nitroso compound or an isomer, salt or derivative thereof on the electrode surface;

(24) the electrolytic capacitor as described in (21) to (23), wherein the nitro or nitroso compound or an isomer, salt or derivative thereof is attached or permeation-filled to the electrode surface by the coating or by the dipping in a solution having dissolved therein the nitro or nitroso compound or an isomer, salt or derivative thereof;

(25) the electrolytic capacitor as described in (21) to (24) above, wherein the nitro or nitroso compound or an isomer, salt or derivative thereof is contained in a separator constituting the electrolytic capacitor;

(26) the electrolytic capacitor as described in (21) to (25) above, wherein the nitro or nitroso compound or an isomer, salt or derivative thereof is attached or dipped to the separator by coating or by dipping in a solution having dissolved therein the nitro or nitroso compound or an isomer, salt or derivative thereof;

(27) the electrolytic capacitor as described in any one of (21) to (24) above, wherein the amount of the nitro or nitroso compound described in (22) above or an isomer, salt or derivative thereof contained in the electrode foil is from 0.007 to 1 mg/cm$^2$ (projectional area);

(28) the electrolytic capacitor as described in (21), (25) and (26) above, wherein the amount of the nitro or nitroso compound or an isomer, salt or derivative thereof contained in the separator is from 0.007 to 1 mg/cm$^2$ (projectional area);

(29) the electrolytic capacitor as described in (21) to (28), wherein the solvent consists of from 20 to 55 wt % of an organic solvent and from 80 to 45 wt % of water; and

(30) the electrolytic capacitor as described in (29) above, wherein the solvent consists of from 20 to 35 wt % of an organic solvent and from 80 to 65 wt % of water.

BRIEF DESCRIPTION OF THE DRAWING

FIG. 1 is a schematic view of an electrolytic capacitor.

BEST MODE FOR CARRYING OUT THE INVENTION

The electrolytic solution for driving an electrolytic capacitor of the present invention is characterized in that a solvent comprising a mixture of an organic solvent and water and having a high water concentration is used as the solvent for dissolving the electrolyte.

For the organic solvent, as described above, a protonic solvent and an aprotic solvent can be used individually or in an arbitrary combination. Suitable examples of the protonic solvent include alcohol compounds. Specific examples of the alcohol compound which can be advantageously used include, but are not limited to, monohydric alcohol such as ethyl alcohol, propyl alcohol and butyl alcohol, dihydric alcohols (glycols) such as ethylene glycol, diethylene glycol, triethylene glycol and propylene glycol, and trihydric alcohols such as glycerin. Suitable examples of the aprotic solvent include lactone compounds. Specific examples of the lactone compound which can be advantageously used include, but are not limited to, γ-butyrolactone and other intramolecular polarizable compounds. In the case of using one or more selected from the protonic and aprotic solvents in practicing the present invention, more specifically, one protonic solvent may be used, one aprotic solvent may be used, a plurality of protonic solvents may be used, a plurality of aprotic solvents may be used, or a mixed solvent of one or more protonic solvent and one or more aprotic solvent may be used. When the nitro or nitroso compound used in the present invention is sparingly soluble in water or a polar solvent, a method of selecting one or more solvent capable of solubilizing the nitro or nitroso compound and dissolving in a polar solvent, and thereby dissolving the nitro or nitroso compound in a solvent constituting the electrolytic solution, water or a polar solvent may be employed. Also, the nitro or nitroso compound may be formed into fine powder in the dissolved solution and uniformly dispersed.

In the electrolytic solution of the present invention, water is used as a solvent component in addition to the above-described organic solvent. Particularly, the present invention differs from conventional electrolytic solutions in that a relatively large amount of water is used in combination. According to the present invention, such a solvent is used, so that the solidifying point of the solvent can be decreased, the electrolytic solution can be in turn improved in the specific resistance property at low temperatures and good low-temperature stability shown by a small difference in the specific resistance between low temperature and ordinary temperature can be realized. The content of water in the electrolytic solution is preferably from 20 to 80 wt %, with the remainder being the organic solvent. If the water content is less than 20 wt % or exceeds 80 wt %, the degree of depression in solidifying point of the electrolytic solution is insufficient and good low-temperature stability of the electrolytic capacitor can hardly be obtained. The content of water in the solvent of the electrolytic solution is preferably from 30 to 80 wt %, more preferably from 45 to 80 wt % by weight, and most preferably from 65 to 80 wt %. In the solvent, the amount of the organic solvent is the remaining amount excluding water.

The electrolyte in the electrolytic solution of the present invention is an organic acid, preferably a carboxylic acid or a salt thereof, or an inorganic acid or a salt thereof. These electrolyte components may be used individually or in a combination of two or more thereof. Examples of the carboxylic acid which can be used as the electrolyte component include, but are not limited to, monocarboxylic acids, dicarboxylic acids, tricarboxylic acids, carboxylic acids having a functional group such as hydroxyl group, saturated carboxylic acids and unsaturated carboxylic acids, represented by formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, and derivatives thereof.

Among these carboxylic acids and salts thereof, preferred in view of ion conductivity are a formic acid, an acetic acid, a p-nitrobenzoic acid, a salicylic acid, an oxalic acid, a malonic acid, a fumaric acid, a maleic acid, a phthalic acid, a citric acid, a sulfamic acid, an ethylenediaminetetraacetic acid, and their ammonium salts, sodium salts, potassium salts, amine salts and alkylammonium salts, more preferred is formic acid because of its large ion conductivity.

Examples of the inorganic acid which can also be used as the electrolyte component include, but are not limited to, inorganic acids represented by phosphoric acid, phosphorous acid, hypophosphorous acid, boric acid, sulfamic acid and alkylphosphoric acid, and inorganic acids having a carbon chain such as alkyl group.

As for the salt of the above-described carboxylic acid or inorganic acid, various salts can be used but suitable examples of the salt include an ammonium salt, a sodium salt, a potassium salt, an amine salt and an alkylammonium salt. Among these salts, an ammonium salt is preferred.

When the inorganic acid or a salt thereof is used as the electrolyte in practicing the present invention, a lowering of the solidifying point of the electrolytic solution can be expected and therefore, this can contribute to a further improvement in the low-temperature stability of the electrolytic solution. The use of the inorganic acid or a salt thereof is also noticeable in that the hydrogen gas absorbing ability derived from the nitro or nitroso compound particularly used in the present invention can be maintained for a long period of time.

According to the studies by the present inventors, when an electrolyte such as inorganic acid or a salt thereof is used in combination with an above-described electrolyte such as carboxylic acid or a salt thereof, an effect of remarkably prolonging the working life of the electrolytic capacitor, as compared with the case where these are used individually, can be obtained. In conventional electrolytic capacitors, an inorganic acid-base electrolyte has been heretofore used mainly in medium to high-voltage (160 to 500 volt) type electrolytic capacitors in view of electrical conductivity. However, when a combination of electrolytes is used as in the present invention, the inorganic acid-base electrolyte can also be advantageously used in low-voltage (less than 160 volt) type electrolytic capacitors.

The amount of the electrolyte used in the electrolytic solution of the present invention can be appropriately determined depending on various factors such as characteristics required of the electrolytic solution and capacitor finally obtained, the kind, composition and amount of solvent used, and the kind of electrolyte used. For example, as above, when an inorganic acid-base electrolyte is used in combination with a carboxylic acid-base electrolyte, the content of the inorganic acid-base electrolyte in the mixed electrolyte can be changed over a wide range, however, usually, the inorganic acid-base electrolyte is preferably contained in an amount of about 0.1 to 15 wt % based on the entire amount of the electrolyte.

As another characteristic feature of the electrolytic solution of the present invention, it is an electrolytic solution for driving an electrolytic capacitor obtained by incorporating at least one nitro or nitroso compound except for nitrophenol, nitrobenzoic acid, dinitrobenzoic acid, nitroacetophenone and nitroanisole, into an electrolytic solution having the above-described specific composition, namely, comprising a mixed solvent consisting of from 20 to 80 wt % of an organic solvent and from 80 to 20 wt % of water, and at least one electrolyte preferably selected from the group consisting of a carboxylic acid or a salt thereof, and an inorganic acid or a salt thereof.

Specific examples of this nitro or nitroso compound include aminonitroanisole, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)-ethanamine, O-ethyl-O-(p-nitrophenyl)thionobenzene, ethylnitrobenzene, ethyl-2-(hydroxyimino)-5-nitro-3-hexeneamide, octanitrobenzoylsaccharose, nitrophenyloctyl ether, nitrophenyl galactopyranoside, 3-carboxy-4-nitrophenyl disulfide, bisnitrobenzylfluorescein, glycerol carbonatenitrobenzene sulfonate, glutamyl nitroanilide, nitrophenyl acetate, nitrobenzylidene acetate, nitroaminothiazole, dithiobisnitrobenzoic acid, dithiobisnitropyridine, dinitroaniline, dinitroquinoxaline-2,3-dione, dinitrosalicylic acid, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzaldehyde, dinitrobenzoylmethylbenzylamine, dinitrobenzophenone, diaminonitrobenzene, dimethylnitroaniline, dimethylnitrophenylphosphorothioate, dimethoxynitrobenzyl alcohol, bis-dinitrophenyl oxalate, succinimidyl nitrophenylacetate, tetranitrophenyl porphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazinemaleic acid, nitrocresol, nitrocinnamic acid, nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphthol, nitrophenylazomethylresorcinol, nitrophenylaniline, nitrophenyloctyl ether, nitrophenylgalactopyranoside, nitrophenylxylopyranoside, nitrophenylglucuronide, nitrophenylglucopyranoside, nitrophenylacetic acid, nitrophenyldodecyl ether, nitrophenylarsonic acid, nitrophenylhydrazine, nitrophenylphenylazophenyl triazene, nitrophenylphenyl ether, nitrophenylmaltopentaoside, nitrophenylmannopyranoside, nitrophenylbutyric acid, diethyl nitrophenylphosphate, nitrophenylenediamine, nitrophenethole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridine, nitrobenzamide, nitrobenzimidazole, nitrobenzohydrazide, nitrobenzeneazoorcinol, nitrobenzeneazonaphthol, nitromethane, nitroethane, nitrobenzeneazoresorcinol, nitrobenzenesulfonic acid, nitrobenzocoumarin, nitrobenzonitrile, nitrobenzophenone, nitromesitylene, nitromethoxyaniline, bisnitrophenyl disulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, 3-[2-hydroxy-1-(1-methylethyl)-2-nitrosohydrazino]-1-propanonamine, phenylnitroaniline, 2-(2-furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitroso oxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenylhydroxylamine ammonium, nitrosophenol, N-[(N-nitrosomethylamino)methyl]benzamide, 2,2'-(hydroxynitrosohydrazono)bisethanamine, N-methyl-2-(1-ethyl-2-hydroxy-2-nitrosohydrazino)-ethanamine, N,N'-dinitroso-p-phenylenediamine, N,N'-dinitrosopentamethylenetetramine, dimethylnitrosoaniline, dimethylnitrosoamine, nitrosonium tetrafluoroborate, N-[N'-methyl-N'-nitroso(aminomethyl)]benzamide, N-methyl-N-nitroso-p-toluenesulfonamide, nitrobenzene, dinitrobenzene, dinitrotoluene, nitronaphthalene, dinitronaphthalene, dinitrobiphenyl, dimethylnitrotoluene, dinitropyrene, nitrobenzoic acid ester, dimethylnitrobenzene, nitroanthracene, nitroisoquinoline, nitroxylene, ethyl nitroacetate, nitrocyclopentane, nitrostyrene, nitropyrrole, nitrofurazone, nitrofluraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene, fluoronitrodiphenyl ether, trinitroacetonitrile, trinitroaniline, trinitrobenzoic acid, trinitroethane, trinitroxylene, trinitrotoluene, trinitronaphthalene, trinitrofluorenone, trinitrobenzene, trinitromesitylene, trinitromethane, trinitroresorcinol, dinitroacetanilide, dinitroanisole, dinitroanthraquinone, dinitroethane, dinitroethanediamine, dinitrocarbanilide, dinitroxylene, dinitroglycerol, dinitrocresol, dinitronaphthol, dinitrophenyl, dinitrophenylhydrazone, dinitromethane, dinitroresorcinol, nitroamide, nitroanthraquinone, nitroisophthalic acid, nitroethylene, ethyl nitrocarbamate, nitroquinaldic acid, nitroguanidine, nitroglycol, nitroglycerin, nitrodimethylamine, nitrocamphor, methylnitropropane, nitrosulfathiazole, nitrocellulose, nitrosoguanidine, nitrosodimethylaniline, nitrosotoluene, nitrosodisulfonic acid, nitrosopiperidine, nitrosomethane, nitrosobenzene, nitrosomethylurea, nitronaphthylamine, nitronaphthol, nitropyridine, nitrophenanthrene, nitrophenylpropiolic acid, nitrophenetidine, nitrophenolsulfonic acid, nitropentane, nitroresorcinol, nitrourea, trinitroxylenol, trinitrodiphenyl ether, trinitrotriazidobenzene, trinitrophloroglucinol, nitroacridine, nitroacridone, nitroacetone, nitroanilic acid, nitroaminoacetic acid, nitroisatin, nitroisobutane, nitroindene, nitrourethane, nitrocarbostyril, nitrodiglycol, nitro-p-cymene, nitrocinnamaldehyde, N-nitrosoacetanilide, nitrosoanisidine, nitrosoaniline, nitrosobenzoic acid, nitrosoanthranilic acid, nitrosocatechol, nitrosocarvacrol, nitrosocresol, nitrosonaphthylamine, nitrothioanisole, nitrothiophenol, nitronaphthalenesulfonic acid, nitronaphthylamine, nitronaphthoic acid, nitronitrosobenzene, nitrohydroquinone, nitropyrogallol, nitrophenanthridine, nitrophenanthroline, nitrophenylurethane, nitrophenylurea, nitrobutane, nitrophthalide, nitrofuran, nitropropylene, nitrophloroglucinol, nitrobenzanilide, nitrobenzaldoxime, nitrobenzoylformic acid, nitrobenzimidazole, nitromalonic acid, nitromalondialdehyde, nitromandelic acid, nitromannitol, nitromethylnaphthalene, nitromalic acid, nitroresorcinol, nitron, nitrosoresorcinol, aminonitropyrimidine, trinitrofluorenylidene malononitrile, nitrofluoranthene, nitrobenzocrown, fluoronitrobenzofurazan, methylnitronitrosoguanidine, methylnitronitrophenylpyrazolone, nitrofluorene, nitropropane, nitropropoxyaniline, trinitroanisole, trinitrocresol, trinitrobenzaldehyde, nitrodiethylaniline, nitrostilbene, nitrosonaphthalene, nitrosobenzaldehyde nitrosomethylurethane, nitrophenylhydrazone, dinitrotartaric acid, dinitrostilbene, dinitrosoresorcinol, dinitrohydroquinone, dinitroresorcinol, nitroquinoline, dinitrosophenol, trinitrosophenol, dinitrosobenzoic acid, trinitrosobenzoic acid, dinitroacetophenone, trinitroacetophenone, nitrosoacetophenone, dinitrosoacetophenone, trinitrosoacetophenone, nitrosoanisole, dinitrosoanisole, trinitrosoanisole and their isomers, salts, derivatives, coordinate bonded forms and clathrate forms.

The electrolytic solution for driving an electrolytic capacitor of the present invention may additionally contain nitrophenol, nitrobenzoic acid, dinitrobenzoic acid, nitroacetophenone, nitroanisole or a salt or derivative thereof in an amount of 0.01 to 10 wt %, together with the nitro or nitroso compound selected from the above-described nitro compounds and nitroso compounds.

The nitro or nitroso compound used here also has an activity of inhibiting the device from corroding by the action of a halogenated hydrocarbon such as trichloroethane used in the cleaning of a printed board (in other words, a halogen-capturing activity).

In adding the nitro or nitroso compound to the electrolytic solution of the present invention, this compound can provide a satisfactory hydrogen gas absorbing effect and a halogen-capturing activity even when used individually, because the electrolytic solution itself has a specific composition effective for obtaining the effect of the present invention, however, according to the knowledge acquired this time by the present inventors, when two or more nitro or nitroso compounds are used in combination, a more preferred effect can be expected by bringing out respective advantageous properties. For example, by combining two or more nitro or nitroso compounds having a quick hydrogen gas absorbing effect and a delayed hydrogen gas absorbing effect, a hydrogen gas absorbing effect can be continuously obtained over a long period of time.

The nitro or nitroso compound is usually used in an amount of preferably from 0.01 to 5 wt % based on the entire amount of the electrolytic solution. If the amount of the nitro or nitroso compound added is less than 0.01 wt %, the expected effect can be scarcely obtained, whereas even if it exceeds 5 wt %, the expected effect cannot be more enhanced and, in the case of a compound having a low solubility, this may adversely affect other properties such as precipitation. However, in the case of having an activity as an electrolyte participating in the electrical conductivity, the nitro or nitroso compound can be added up to 10 wt %.

The excellent hydrogen gas absorbing effect of the present invention can be confirmed also in the relation with the electrolyte used together. In conventional electrolytic solutions, only one nitro compound is added to only a carboxylic acid-base electrolyte or only one nitro compound is added to only an inorganic acid-base electrolyte. By this means, however, a satisfactory hydrogen gas absorbing effect cannot be obtained when the content of water in the solvent is large. The same applies to an electrolytic solution where a carboxylic acid-base electrolyte and an inorganic acid-base electrolyte are mixed. However, in the case of the electrolytic solution of the present invention (using only one nitro or nitroso compound), surprisingly, a hydrogen gas absorbing ability can be maintained for a far longer period of time than the conventional sole use, even in the carboxylic acid-base/inorganic acid-base mixed electrolytes.

If desired, the electrolytic solution of the present invention can contain components other than those described above, as additional additives. Suitable examples of additives include the following compounds described in the invention which the present inventors have invented simultaneously with the present invention and filed as a separate patent application.

(1) Chelate Compound:

Examples thereof include ethylenediaminetetraacetic acid (EDTA), trans-1,2-diaminocyclohexane-N,N,N',N'-tetraacetic acid monohydrate (CyDTA), dihydroxyethylglycine (DHEG), ethylenediaminetetrakis(methylenephosphonic acid) (EDTPO), diethylenetriamine-N,N,N',N'',N''-pentaacetic acid (DTPA), diaminopropanoltetraacetic acid (DPTA-OH), ethylnediaminediacetic acid (EDDA), ethylenediamine-N,N'-bis(methylenephosphonic acid) hemihydrate (EDDPO), glycol ether diaminetetraacetic acid (GEDTA) and hydroxyethylethylenediaminetriacetic acid (EDTA-OH). Generally, the chelate compound is preferably added in an amount of 0.01 to 3 wt %. Such a chelate compound can provide effects such as prolongation of the working life of a capacitor due to inhibition of the hydration reaction of an aluminum (Al) electrode foil of a low-impedance capacitor, improvement in the low-temperature stability of an electrolytic capacitor (the solvent has a composition close to non-frozen state and therefore, the change in the impedance between normal temperature and low temperature decreases), and improvement of corrosion resistance.

(2) Saccharides:

Examples thereof include glucose, fructose, xylose and galactose. Generally, the saccharides are preferably added in an amount of 0.01 to 5 wt %. These saccharides can provide effects such as prolongation of the working life of a capacitor due to inhibition of the hydration reaction of an Al electrode foil of a low-impedance capacitor, inhibition of decomposition or activation of an electrolyte (e.g. carboxylic acid) due to the addition of saccharides, and improvement in the low-temperature stability of an electrolytic capacitor (the solvent has a composition close to non-frozen state and therefore, the change in the impedance between normal temperature and low temperature decreases).

(3) Hydroxybenzyl Alcohol:

Examples thereof include 2-hydroxybenzyl alcohol, L-glutamic-diacetic acid and a salt thereof. Generally, this additive is preferably added in an amount of 0.01 to 5 wt %. This additive can provide effects such as prolongation of the working life of a capacitor due to inhibition of the hydration reaction of an Al electrode foil of a low-impedance capacitor, and improvement in the low-temperature stability of an electrolytic capacitor (the solvent has a composition close to non-frozen state and therefore, the change in the impedance between normal temperature and low temperature decreases).

These compounds (1) to (3) each can provide many remarkable effects when added to the electrolytic solution of the present invention.

In addition to the above-described additives (including the case of adding a sole nitro or nitroso compound), the electrolytic solution of the present invention can contain, if desired, (4) gluconic acid, gluconic lactone and the like individually or in combination. Generally, this additive is preferably added in an amount of 0.01 to 5 wt %. The gluconic acid or gluconic lactone additionally contained in the electrolytic solution of the present invention can provide remarkable effects such as improvement of corrosion resistance in addition to the effects such as prolongation of the working life of an electrolytic capacitor and improvement in the low-temperature stability, and the effects peculiar to the present invention such as excellent hydrogen gas absorbing effect.

Other than the additives described above, additives commonly used in the field of aluminum electrolytic capacitor or other electrolytic capacitors may be further added. Suitable examples of the additives commonly used include mannitol, silane coupling agent, water-soluble silicone and polymer electrolyte. The electrolytic solution of the present invention can be prepared by mixing and dissolving those various components in an arbitrary order. Fundamentally, a conventional technique can be used as it is without any modification. For example, the electrolytic solution of the present invention can be easily prepared by preparing a solvent having a high water concentration, which is a mixture of an organic solvent and water, and then dissolving an electrolyte, a nitro or nitroso compound and if desired, arbitrary additives in the obtained solvent.

The electrolytic capacitor of the present invention can also be produced according to a conventional technique, similarly to the electrolytic solution. For example, an anode foil and a cathode foil are prepared by forming an oxide film as a dielectric material on an electrode foil to a predetermined thickness, these anode and cathode foils are disposed to face each other and a separator (release paper) is interposed therebetween. The thus-fabricated device is impregnated with the electrolytic solution of the present invention and then packaged by an appropriate method, whereby an aluminum electrolytic capacitor can be produced. In the obtained aluminum electrolytic capacitor, the electrolytic solution of the present invention is used, so that there can be achieved an effect of improving the low-temperature stability due to a mixed solvent of an organic solvent and water, a hydrogen gas absorbing effect due to addition of a nitro compound, and an effect Of prolonging the working life and giving a low impedance resulting from inhibition of the hydration reaction due to use of a specific electrolyte.

Furthermore, according to the present invention, it is confirmed that a sufficiently high hydrogen absorbing effect can be exerted even when the nitro or nitroso compound is not present in the electrolytic solution but when the nitro or nitroso compound is present in a physically hydrogen-generating site, more specifically, in the form of a film or the like on the electrode surface or in the vicinity thereof or in the state of being contained in the separator. Also when the nitro or nitroso compound is attached to the inner surface of the capacitor container, suitable effects are confirmed. Particularly, the site attached with a current takeout lead of the electrode readily generates hydrogen and therefore, it is effective to localize a nitro or nitroso compound thereat. As such, even when the nitro or nitroso compound is present in a portion inside the capacitor other than in the electrolytic solution, the effects can be confirmed. Moreover, in this case, the nitro or nitroso compound can be present also in the electrolytic solution in addition to the portion except for in the electrolytic solution, inside the capacitor, and this is a preferred embodiment.

In the case of allowing the nitro or nitroso compound to be present in such a form inside the capacitor, the nitro or nitroso compound needs not be soluble in the electrolytic solution or may have a low solubility and this provides an effect of extending the selection range of the nitro or nitroso compound which can be used.

For example, the nitro or nitroso compound is dissolved in a soluble solvent and the resulting solution is coated on an electrode (foil or electrode tab) or a separator and if desired, dried, or the electrode (foil or electrode tab) is dipped in the solution, whereby the nitro or nitroso compound can be attached to the separator. The solvent in which the nitro or nitroso compound is dissolved may or may not be soluble in the electrolytic solution. This is for the following reasons. Even if the solvent is soluble or insoluble in the electrolytic solution, the same coated film results when dried after the coating. In the case where the solution is not dried and a wet coated film is present, even if the solvent is soluble, when the solvent has a high viscosity, the coated film is present in the thin spacing between electrodes for a long period of time while having a concentration gradient. Also, even when the solvent is insoluble, it may suffice if the nitro or nitroso compound can react with hydrogen. That is, the method of attaching the nitro or nitroso compound or allowing it to be present on the electrode surface or inner surface of the container or the method of incorporating the compound into the separator is not particularly limited. When the nitro or nitroso compound is present in a portion inside the capacitor other than in the electrolytic solution, even if a part of the nitro or nitroso compound dissolves in the electrolytic solution, this causes no problem.

In the case of attaching or incorporating the nitro or nitroso compound to the electrode or separator, the amount thereof is more than the amount of giving the effects when added to the electrolytic solution, that is, 0.01% or more in terms of the electrolytic solution and the amount is optimally from 0.007 to 1 mg/cm$^2$ (projected area). When the nitro or nitroso compound is present in the site other than the electrode or separator or when present also in the electrolytic solution, the amount may be appropriately corrected.

Examples of the nitro compound and the nitroso compound which can be used in such a method include aminonitroanisole, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)-ethanamine, O-ethyl-O-(p-nitrophenyl)thionobenzene, ethylnitrobenzene, ethyl-2-(hydroxyimino)-5-nitro-3-hexeneamide, octanitrobenzoylsaccharose, nitrophenyloctyl ether, nitrophenyl galactopyranoside, 3-carboxy-4-nitrophenyl disulfide, bisnitrobenzylfluorescein, glycerol carbonatenitrobenzene sulfonate, glutamyl nitroanilide, nitrophenyl acetate, nitrobenzylidene acetate, diaminonitrobenzene, dithiobisnitrobenzoic acid, dithiobisnitropyridine, dinitroaniline, dinitroquinoxaline-2,3-dione, dinitrosalicylic acid, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzaldehyde, dinitrobenzoylmethylbenzylamine, dinitrobenzophenone, nitroaminothiazole, dimethylnitroaniline, dimethylnitrophenylphosphorothioate, dimethoxynitrobenzyl alcohol, bisdinitrophenyl oxalate, succinimidyl nitrophenylacetate, tetranitrophenyl porphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazinemaleic acid, nitrocresol, nitrocinnamic acid, nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphthol, nitrophenylazomethylresorcinol, nitrophenylaniline, nitrophenyloctyl ether, nitrophenylgalactopyranoside, nitrophenylxylopyranoside, nitrophenylglucuronide, nitrophenylglucopyranoside, nitrophenylacetic acid, nitrophenyldodecyl ether, nitrophenylarsonic acid, nitrophenylhydrazine, nitrophenylphenylazophenyl triazene, nitrophenylphenyl ether, nitrophenylmaltopentaoside, nitrophenylmannopyranoside, nitrophenylbutyric acid, diethyl nitrophenylphosphate, nitrophenylenediamine, nitrophenethole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridine, nitrobenzamide, nitrobenzimidazole, nitrobenzohydrazide, nitrobenzeneazoorcinol, nitrobenzeneazonaphthol, nitromethane, nitroethane, nitrobenzeneazoresorcinol, nitrobenzenesulfonic acid, nitrobenzocoumarin, nitrobenzonitrile, nitrobenzophenone, nitromesitylene, nitromethoxyaniline, bisnitrophenyl disulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, 3-[2-hydroxy-1-(1-methylethyl)-2-nitrosohydrazino]-1-propanonamine, phenylnitroaniline, 2-(2- furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitroso oxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenylhydroxylamine ammonium, nitrosophenol, N-[(N-nitrosomethylamino)methyl]benzamide, 2,2'-(hydroxynitrosohydrazono)bisethanamine, N-methyl-2-(1-ethyl-2-hydroxy-2-nitrosohydrazino)-ethanamine, N,N'-dinitroso-p-phenylenediamine, N,N'-dinitrosopentamethylenetetramine, dimethylnitrosoaniline, dimethylnitrosoamine, nitrosonium tetrafluoroborate, N-[N'-methyl-N'-nitroso(aminomethyl)]benzamide, N-methyl-N-nitroso-p-toluenesulfonamide, nitrophenol, nitrobenzoic acid, dinitrobenzoic acid, nitroacetophenone, nitroanisole, nitrobenzene, dinitrobenzene, dinitrotoluene, nitronaphthalene, dinitronaphthalene, dinitrobiphenyl, dimethylnitrotoluene, dinitropyrene, nitrobenzoic acid ester, dimethylnitrobenzene, nitroanthracene, nitroisoquinoline, nitroxylene, ethyl nitroacetate, nitrocyclopentane, nitrostyrene, nitropyrrole, nitrofurazone, nitrofuraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene, fluoronitrodiphenyl ether, trinitroacetonitrile, trinitroaniline, trinitrobenzoic acid, trinitroethane, trinitroxylene, trinitrotoluene, trinitronaphthalene, trinitrofluorenone, trinitrobenzene, trinitromesitylene, trinitromethane, trinitroresorcinol, dinitroacetanilide, dinitroanisole, dinitroanthraquinone, dinitroethane, dinitroethanediamine, dinitrocarbanilide, dinitroxylene, dinitroglycerol, dinitrocresol, dinitronaphthol, dinitrophenyl, dinitrophenylhydrazone, dinitromethane, dinitroresorcinol, nitroamide, nitroanthraquinone, nitroisophthalic acid, nitroethylene, ethyl nitrocarbamate, nitroquinaldic acid, nitroguanidine, nitroglycol, nitroglycerin, nitrodimethylamine, nitrocamphor, methylnitropropane, nitrosulfathiazole, nitrocellulose, nitrosomethane, nitrosoguanidine, nitrosodimethylaniline, nitrosotoluene, nitrosodisulfonic acid, nitrosopiperidine, nitrosobenzene, nitrosomethylurea, nitronaphthylamine, nitronaphthol, nitropyridine, nitrophenanthrene, nitrophenylpropiolic acid, nitrophenetidine, nitrophenolsulfonic acid, nitropentane, nitroresorcinol, nitrourea, trinitroxylenol, trinitrodiphenyl ether, trinitrotriazidobenzene, trinitrophloroglucinol, nitroacridine, nitroacridone, nitroacetone, nitroanilic acid, nitroaminoacetic acid, nitroisatin, nitroisobutane, nitroindene, nitrourethane, nitrocarbostyril, nitrodiglycol, nitro-p-cymene, nitrocinnamaldehyde, N-nitrosoacetanilide, nitrosoanisidine, nitrosoaniline, nitrosobenzoic acid, nitrosoanthranilic acid, nitrosocatechol, nitrosocarvacrol, nitrosocresol, nitrosonaphthylamine, nitrothioanisole, nitrothiophenol, nitronaphthalenesulfonic acid, nitronaphthylamine, nitronaphthoic acid, nitronitrosobenzene, nitrohydroquinone, nitropyrogallol, nitrophenanthridine, nitrophenanthroline, nitrophenylurethane, nitrophenylurea, nitrobutane, nitrophthalide, nitrofuran, nitropropylene, nitrophloroglucinol, nitrobenzanilide, nitrobenzaldoxime, nitrobenzoylformic acid, nitrobenzimidazole, nitromalonic acid, nitromalondialdehyde, nitromandelic acid, nitromannitol, nitromethylnaphthalene, nitromalic acid, nitroresorcinol, nitron, nitrosoresorcinol, aminonitropyrimidine, trinitrofluorenylidene malononitrile, nitrofluoranthene, nitrobenzocrown, fluoronitrobenzofurazan, methylnitrosoguanidine, methylnitronitrophenylpyrazolone, nitrofluorene, nitropropane, nitropropoxyaniline, trinitroanisole, trinitrocresol, trinitrobenzaldehyde, nitrodiethylaniline, nitrostilbene, nitrosonaphthalene, nitrosobenzaldehyde, nitrosomethylurethane, nitrophenylhydrazone, dinitrotartaric acid, dinitrostilbene, dinitrosoresorcinol, dinitrohydroquinone, dinitroresorcinol, nitroquinoline, dinitrosophenol, trinitrosophenol, dinitrosobenzoic acid, trinitrosobenzoic acid, dinitroacetophenone, trinitroacetophenone, nitrosoacetophenone, dinitrosoacetophenone, trinitrosoacetophenone, nitrosoanisole, dinitrosoanisole, trinitrosoanisole and their isomers, salts, derivatives, coordinate bonded forms and clathrate forms. Similarly to the addition of the nitro compound, the capacitor manufactured as such can achieve a hydrogen gas absorbing effect and an effect of prolonging the working life and giving a low impedance resulting from inhibition of the hydration reaction due to the electrolytic solution using a specific electrolyte.

In still another aspect, based on the above-described experimental results and knowledge, the present invention provides an electrolytic capacitor comprising the electrolytic solution for driving an electrolytic capacitor of the present invention, and an electrolytic capacitor comprising a nitro or nitroso compound inside the capacitor.

The structure and shape of the electrolytic capacitor using the electrolytic solution for an electrolytic capacitor of the present invention are not particularly limited but examples thereof are briefly described below by referring to FIG. 1. The capacitor 1 comprises a sealing case 3 and a coiled element 5 housed in the sealing case 3. The element 5 contains an anode foil 9 composed of an aluminum foil having a surface dielectric film 11 formed by anodization, an aluminum cathode foil 13 opposing the surface electrode film 11 of the anode foil 9, and a separator 15 between the anode foil 11 and the cathode foil 13. The stacked body 7 is wound together with another separator 17 to provide a coil element 5 and the element is impregnated with an electrolytic solution and disposed in the case 3. In FIG. 1, an anode lead wire 21 and a cathode lead wire 23 are connected to the anode foil 11 and the cathode foil 13, respectively, through respective lead tabs (not shown). The electrolytic capacitor of the present invention uses the electrolytic solution for an electrolytic capacitor of the present invention.

EXAMPLES

The present invention is described in greater detail below by referring to Examples. These Examples are only to illustrate the present invention and, needless to say, the present invention is not limited thereto.

The electrolytic solutions used in Examples were measured for specific resistance at 30° C. and the results are shown in the Table of each Example. Also, the manufactured electrolytic capacitors were measured for impedance at low temperature (−40° C.) and impedance at ordinary temperature (20° C.), then the impedance ratio (Z ratio) as the ratio of respective measured values was determined at different frequencies of 120 Hz and 100 kHz and the values are shown in the Table of each Example. Furthermore, for evaluating the working life property of each electrolytic capacitor, the capacitance, tan δ and leakage current were examined each on the initial Property (characteristic value immediately after the manufacture of capacitor) and the characteristic change after the passing of a predetermined time while applying a rated voltage under a high-temperature load test condition of 105° C. and results are shown in the Table of each Example.

Examples 1 to 10

An electrolytic capacitor (10 WV-1,000 μF) device having a coil structure was impregnated with an electrolytic solution having the composition shown in Table 1 below and housed in an aluminum case with a bottom such that the lead tab for taking out the electrode was protruded outside the case, and the opening of this case was sealed with an elastic sealant to manufacture an electrolytic capacitor. The results obtained in the characteristic tests are shown together in Table 1 below.

Comparative Examples 1 to 4

The procedure of Example 1 was repeated except that in these examples, for the purpose of comparison, a nitro or nitroso compound was eliminated from the electrolytic solution used and the composition of the electrolytic solution was changed as shown in Table 1 below. The results obtained in the characteristic tests are shown together in Table 1 below.

TABLE 1

| No. | Composition of Electrolytic Solution | [wt %] | Specific Resistance at 30° C. [Ω·cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 2 | Ethylene glycol<br>Water<br>Ammonium adipate | 60.0<br>30.0<br>10.0 | 85 | 1.3 | 36.1 | 1008 | 7.0 | 6.5 | In all samples, the safety vent was actuated in 500 hours due to gas evolution. | | | |
| Comparative Example 3 | Ethylene glycol<br>Water<br>Ammonium adipate | 45.0<br>40.0<br>15.0 | 40 | 1.1 | 9.7 | 1014 | 5.7 | 6.1 | In all samples, the safety vent was actuated in 250 hours due to gas evolution. | | | |
| Comparative Example 4 | Ethylene glycol<br>Water<br>Ammonium adipate | 30.0<br>50.0<br>20.0 | 20 | 1.0 | 7.9 | 1023 | 4.7 | 6.9 | In all samples, the safety vent was actuated in 250 hours due to gas evolution. | | | |
| Example 1 | Ethylene glycol<br>Water<br>Ammonium formate<br>Hypophosphorous acid<br>Nitrophenol<br>Dinitrodiphenylamine | 25.0<br>68.0<br>4.6<br>0.4<br>1.0<br>1.0 | 28 | 1.1 | 4.5 | 1027 | 5.3 | 8.2 | 906 | 6.0 | 2.9 | |
| Example 2 | Ethylene glycol<br>Water<br>Ammonium glutarate<br>Sulfamic acid<br>Diaminonitrobenzene<br>Dinitrophthalic acid | 20.0<br>60.0<br>18.0<br>1.4<br>0.3<br>0.3 | 27 | 1.1 | 4.3 | 1040 | 5.4 | 8.4 | 926 | 6.1 | 2.9 | |
| Example 3 | Ethylene glycol<br>Water<br>Ammonium adipate<br>Phosphorous acid<br>Nitroaminothiazole<br>Aminonitroanisole | 15.0<br>60.0<br>23.0<br>1.0<br>0.4<br>0.6 | 26 | 1.1 | 4.8 | 1038 | 5.3 | 8.1 | 934 | 5.9 | 2.8 | |
| Example 4 | Ethylene glycol<br>Water<br>Ammonium formate<br>Succinic acid<br>Dithiobisnitrobenzoic acid | 25.0<br>50.0<br>23.6<br>0.4<br>1.0 | 30 | 1.1 | 4.3 | 1021 | 5.2 | 8.0 | 930 | 5.8 | 2.9 | |
| Example 5 | Ethylene glycol<br>Water<br>Ammonium sulfamate<br>Nitrosophenylaniline | 55.0<br>28.0<br>16.0<br>1.0 | 40 | 1.0 | 3.7 | 1011 | 6.4 | 7.9 | 940 | 7.0 | 2.4 | |
| Example 6 | Ethylene glycol<br>Water<br>Ammonium adipate<br>Acetic acid<br>Aminonitrophenol | 59.0<br>20.0<br>19.0<br>0.6<br>1.4 | 72 | 1.0 | 3.9 | 1002 | 6.7 | 7.8 | 944 | 7.3 | 2.4 | |
| Example 7 | Ethylene glycol<br>Water<br>Ammonium glutarate<br>Aminonitrophenol-sulfonic acid | 62.0<br>27.0<br>10.0<br>1.0 | 64 | 1.0 | 3.8 | 1007 | 6.5 | 7.9 | 942 | 7.1 | 2.6 | |
| Example 8 | Ethylene glycol<br>Water<br>Ammonium adipate<br>Phosphoric acid<br>Nitrobenzoic acid<br>Nitroaminophenol | 38.8<br>40.0<br>20.0<br>0.2<br>0.7<br>0.9 | 46 | 1.0 | 3.6 | 1018 | 6.0 | 8.1 | 937 | 6.6 | 2.9 | |
| Example 9 | Ethylene glycol<br>Water | 50.0<br>40.0 | 68 | 1.0 | 3.7 | 1014 | 6.4 | 6.2 | 943 | 7.0 | 3.3 | |

TABLE 1-continued

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Example 10 | Ammonium glutarate Ethyl nitrobenzoate Ethylene glycol Water Ammonium adipate Hypophosphorous acid Aminonitrobenzonitrile | 1.3 0.6 40.0 50.2 8.0 0.8 1.0 | 53 | 1.0 | 3.7 | 1019 | 6.1 | 7.8 | 948 | 6.7 | 3.1 | |

As can be seen from these results, in the electrolytic capacitors using the electrolytic solution of the present invention, the Z ratio is small, particularly, the Z ratio at a high frequency of 100 kH is small as compared with those of Comparative Examples. This reveals that the electrolytic capacitor using the electrolytic solution of the present invention exhibits good low-temperature stability over a wide frequency range. particularly, in the electrolytic capacitors using the electrolytic solution of the present invention, when a nitro compound was added to the electrolytic Solution in an amount of 0.01 to 5 wt %, stable properties were exhibited even after the passage of 2,000 hours at 105° C. and the capacitor itself was free of breakage or characteristic abnormality ascribable to gas generation. On the other hand, in all electrolytic capacitors of Comparative Examples using an electrolytic solution not containing a nitro or nitroso compound, a safety vent was actuated as a result of expansion of the case caused by the generation of hydrogen gas at the initial stage of the high-temperature loading before the passing of 2,000 hours and the capacitor could not be used. It is understood from these Examples that, according to the Present invention, the prolongation of the working life of an electrolytic capacitor can be easily achieved.

Examples 11 to 20

The procedure of Example 1 was repeated except that in these Examples, the compositions of the electrolytic solutions used were changed to those shown together in Table 2 below so as to confirm the effect brought by the simultaneous addition of a chelate compound and a nitro or nitroso compound. As seen in the Table, satisfactory results were obtained. In Table 2 below, test results of Comparative Examples 1 to 4 are also shown.

TABLE 2

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol Water Ammonium adipate | 90.0 5.0 5.0 | 180 | 4.0 | 120.0 | 1002 | 8.5 | 6.5 | 940 | 8.6 | 6.2 | |
| Comparative Example 2 | Ethylene glycol Water Ammonium adipate | 60.0 30.0 10.0 | 85 | 1.3 | 36.1 | 1008 | 7.0 | 6.5 | In all samples, the safety vent was actuated in 500 hours due to gas evolution. | | | |
| Comparative Example 3 | Ethylene glycol Water Ammonium adipate | 45.0 40.0 15.0 | 40 | 1.1 | 9.7 | 1014 | 5.7 | 6.1 | In all samples, the safety vent was actuated in 250 hours due to gas evolution. | | | |
| Comparative Example 4 | Ethylene glycol Water Ammonium adipate | 30.0 50.0 20.0 | 20 | 1.0 | 7.9 | 1023 | 4.7 | 6.9 | In all samples, the safety vent was actuated in 250 hours due to gas evolution. | | | |
| Example 11 | Ethylene glycol Water Ammonium glutarate Sulfamic acid Diaminonitrobenzene Ethylenediamine-tetraacetic acid | 20.0 60.0 18.0 1.4 0.3 0.3 | 27 | 1.1 | 4.3 | 1040 | 5.4 | 8.4 | 936 | 6.0 | 2.9 | |
| Example 12 | Ethylene glycol Water Ammonium adipate Nitroaminothiazole Ethylenediamine-diacetic acid | 15.0 60.0 24.0 0.4 0.6 | 26 | 1.1 | 4.8 | 1038 | 5.3 | 8.1 | 934 | 5.9 | 2.8 | |
| Example 13 | Ethylene glycol Water Ammonium succinate Benzenesulfonic acid | 25.0 50.0 23.6 0.4 | 30 | 1.1 | 4.3 | 1021 | 5.2 | 8.0 | 930 | 5.8 | 2.9 | |

TABLE 2-continued

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (µF) | Initial Value tan δ [%] | Initial Value Leakage Current [µA] | After 2,000 Hours at 105° C. Capacitance [µF] | After 2,000 Hours at 105° C. tan δ [%] | After 2,000 Hours at 105° C. Leakage Current [µA] | Appearance |
|---|---|---|---|---|---|---|---|---|---|---|---|---|
| Example 14 | Aminonitrotoluene Diethylenetriamine- pentaacetic acid Ethylene glycol Water Ammonium sulfamate Phosphoric acid | 0.6 0.4 55.0 28.0 14.0 2.0 | 59 | 1.0 | 3.7 | 1011 | 6.4 | 7.9 | 940 | 7.8 | 2.4 | |
| Example 15 | Dinitroaniline Ethylenediamine- tetraacetic acid Ethylene glycol Water Ammonium adipate Boric acid | 0.6 0.4 59.0 20.0 19.0 0.6 | 72 | 1.0 | 3.9 | 1002 | 6.7 | 7.8 | 944 | 7.3 | 2.4 | |
| Example 16 | Aminonitrophenol Ethylenediamine- diacetic acid Ethylene glycol Water Ammonium adipate EDTPO | 1.0 0.4 62.0 27.0 10.0 0.1 | 64 | 1.0 | 3.8 | 1007 | 6.5 | 7.9 | 942 | 7.1 | 2.6 | |
| Example 17 | Nitrosophenol Ethylenediamine- tetraacetic acid Ethylene glycol Water Ammonium glutarate Aminonitrobenzo- thiazole EDTPO | 0.5 0.4 38.8 40.0 20.0 0.3 0.9 | 46 | 1.0 | 3.6 | 1018 | 6.0 | 8.1 | 937 | 6.6 | 2.9 | |
| Example 18 | Ethylene glycol Water Ammonium adipate Sulfamic acid Ethyl nitrobenzoate Ethylenediamine- diacetic acid | 50.0 40.0 9.0 0.4 0.2 0.4 | 68 | 1.0 | 3.7 | 1014 | 6.4 | 6.2 | 943 | 7.0 | 3.3 | |
| Example 19 | Ethylene glycol Water Ammonium adipate Hypophosphorous acid Aminonitrobenzo- nitrile Diethylenetriamine- pentaacetic acid | 40.0 50.2 8.0 0.8 0.4 0.6 | 53 | 1.0 | 3.7 | 1019 | 6.1 | 7.8 | 948 | 6.7 | 3.1 | |
| Example 20 | Ethylene glycol Water Ammonium sulfamate Phosphoric acid Aminonitrobenzene- sulfonic acid Ethylenediamine- tetraacetic acid | 35.1 50.0 13.0 1.2 0.3 0.4 | 56 | 1.0 | 3.7 | 1022 | 6.3 | 7.9 | 950 | 6.9 | 3.2 | |

Examples 21 to 30

The procedure of Example 1 was repeated except that in these Examples, the compositions of the electrolytic solutions used were changed to those shown together in Table 3 below so as to confirm the effect brought by the simultaneous addition of saccharides and a nitro or nitroso compound. As seen in Table 3, satisfactory test results were obtained. In Table 3 below, the test results of Comparative Examples 1 to 4 are also shown.

TABLE 3

| No. | Composition of Electrolytic Solution | [wt %] | Specific Resistance at 30° C. [Ω·cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 2 | Ethylene glycol<br>Water<br>Ammonium adipate | 60.0<br>30.0<br>10.0 | 85 | 1.3 | 36.1 | 1008 | 7.0 | 6.5 | In all samples, the safety vent was actuated in 500 hours due to gas evolution. | | | |
| Comparative Example 3 | Ethylene glycol<br>Water<br>Ammonium adipate | 45.0<br>40.0<br>15.0 | 40 | 1.1 | 9.7 | 1014 | 5.7 | 6.1 | In all samples, the safety vent was actuated in 250 hours due to gas evolution. | | | |
| Comparative Example 4 | Ethylene glycol<br>Water<br>Ammonium adipate | 30.0<br>50.0<br>20.0 | 20 | 1.0 | 7.9 | 1023 | 4.7 | 6.9 | In all samples, the safety vent was actuated in 250 hours due to gas evolution. | | | |
| Example 21 | Ethylene glycol<br>Water<br>Ammonium glutarate<br>Fructose<br>Dinitrosalicylic acid<br>Sulfamic acid | 19.8<br>60.0<br>17.8<br>1.0<br>0.4<br>1.0 | 30 | 1.1 | 4.4 | 1030 | 5.2 | 7.8 | 917 | 5.8 | 2.4 | |
| Example 22 | Ethylene glycol<br>Water<br>Ammonium adipate<br>Ethyl nitrobenzene<br>Xylose | 14.8<br>60.0<br>23.8<br>0.5<br>1.0 | 25 | 1.1 | 4.7 | 1027 | 4.8 | 7.9 | 924 | 5.4 | 2.6 | |
| Example 23 | Ethylene glycol<br>Water<br>Ammonium succinate<br>Glucose<br>Dinitrophenol<br>Benzenesulfonic acid | 21.2<br>52.0<br>24.8<br>1.0<br>0.6<br>0.4 | 26 | 1.1 | 3.8 | 1025 | 5.0 | 7.8 | 930 | 5.6 | 2.5 | |
| Example 24 | Ethylene glycol<br>Water<br>Ammonium borate<br>Dinitrobenzophenone<br>Xylose | 48.7<br>40.8<br>9.0<br>0.5<br>1.0 | 51 | 1.0 | 4.1 | 1016 | 6.2 | 7.4 | 935 | 6.8 | 2.8 | |
| Example 25 | Ethylene glycol<br>Water<br>Ammonium sulfamate<br>Fructose<br>Dimethylnitroaniline<br>Phosphoric acid | 53.2<br>31.0<br>13.8<br>1.0<br>0.5<br>0.5 | 64 | 1.0 | 3.9 | 1009 | 6.5 | 7.7 | 938 | 7.1 | 2.4 | |
| Example 26 | Ethylene glycol<br>Water<br>Ammonium adipate<br>Glucose<br>Ethyl nitrobenzoate<br>Boric acid | 59.2<br>20.8<br>17.8<br>0.5<br>0.7<br>1.0 | 59 | 1.0 | 3.6 | 1011 | 6.2 | 6.3 | 944 | 6.8 | 2.4 | |
| Example 27 | Ethylene glycol<br>Water<br>Ammonium adipate<br>Dimethoxynitrobenzyl alcohol<br>Fructose | 61.9<br>27.0<br>9.3<br>0.8<br>1.0 | 66 | 1.0 | 3.8 | 1003 | 7.2 | 6.9 | 944 | 7.8 | 2.4 | |
| Example 28 | Ethylene glycol<br>Water<br>Ammonium glutarate<br>Trinitrophenol<br>Galactose | 38.2<br>41.0<br>18.8<br>1.0<br>1.0 | 45 | 1.0 | 3.7 | 1016 | 5.9 | 6.6 | 935 | 6.5 | 2.5 | |
| Example 29 | Ethylene glycol<br>Water<br>Ammonium adipate<br>Sulfamic acid<br>Nitroaniline<br>Xylose | 47.7<br>39.7<br>10.2<br>0.4<br>1.0<br>1.0 | 52 | 1.0 | 4.0 | 1014 | 6.3 | 7.1 | 943 | 6.9 | 2.6 | |
| Example 30 | Ethylene glycol<br>Water<br>Ammonium succinate<br>Boric acid<br>Nitroaminophenol<br>Glucose | 51.2<br>30.1<br>16.2<br>1.1<br>0.4<br>1.0 | 63 | 1.0 | 3.6 | 1018 | 6.9 | 6.7 | 947 | 7.5 | 2.7 | |

Examples 31 to 40

The procedure of Example 1 was repeated except that, in these Examples, the compositions of the electrolytic solutions used were changed to those shown together in Table 4 below so as to confirm the effect brought by the simultaneous addition of hydroxybenzyl alcohol, glutamic-diacetic acid or the like and a nitro or nitroso compound. As seen in Table 4, satisfactory test results were obtained. In Table 4 below, test results of Comparative Examples 1 to 4 are also shown.

TABLE 4

| No. | Composition of Electrolytic Solution | [wt %] | Specific Resistance at 30° C. [Ω·cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 2 | Ethylene glycol<br>Water<br>Ammonium adipate | 60.0<br>30.0<br>10.0 | 85 | 1.3 | 36.1 | 1008 | 7.0 | 6.5 | In all samples, the safety vent was actuated in 500 hours due to gas evolution. | | | |
| Comparative Example 3 | Ethylene glycol<br>Water<br>Ammonium adipate | 45.0<br>40.0<br>15.0 | 40 | 1.1 | 9.7 | 1014 | 5.7 | 6.1 | In all samples, the safety vent was actuated in 250 hours due to gas evolution. | | | |
| Comparative Example 4 | Ethylene glycol<br>Water<br>Ammonium adipate | 30.0<br>50.0<br>20.0 | 20 | 1.0 | 7.9 | 1023 | 4.7 | 6.9 | In all samples, the safety vent was actuated in 250 hours due to gas evolution. | | | |
| Example 31 | Ethylene glycol<br>Water<br>Ammonium glutarate<br>Sulfamic acid<br>Nitroethanol<br>Glutamic-diacetic acid | 17.7<br>61.0<br>17.2<br>1.7<br>1.0<br>1.4 | 26 | 1.1 | 4.4 | 1034 | 5.0 | 7.6 | 920 | 5.6 | 2.6 | |
| Example 32 | Ethylene glycol<br>Water<br>Ammonium adipate<br>Nitrophenyl acetate<br>Glutamic-diacetic acid | 14.2<br>60.0<br>23.4<br>1.0<br>1.4 | 23 | 1.1 | 4.5 | 1036 | 4.8 | 7.8 | 932 | 5.4 | 2.6 | |
| Example 33 | Ethylene glycol<br>Water<br>Ammonium succinate<br>Benzenesulfonic acid<br>Nitroquinoline<br>Hydroxybenzyl alcohol | 21.0<br>51.3<br>24.8<br>0.4<br>0.5<br>2.0 | 28 | 1.1 | 4.2 | 1033 | 5.1 | 7.8 | 930 | 5.7 | 2.7 | |
| Example 34 | Ethylene glycol<br>Water<br>Ammonium borate<br>Nitrodiphenylamine<br>Hydroxybenzyl alcohol | 44.7<br>40.2<br>9.8<br>1.0<br>4.3 | 58 | 1.2 | 4.0 | 1026 | 6.6 | 7.4 | 944 | 7.2 | 2.5 | |
| Example 35 | Ethylene glycol<br>Water<br>Ammonium sulfamate<br>Phosphoric acid<br>Nitrobiphenyl<br>Glutamic-diacetic acid | 52.2<br>30.4<br>13.8<br>0.4<br>0.6<br>2.6 | 67 | 1.0 | 3.7 | 1019 | 6.9 | 7.9 | 948 | 7.5 | 2.4 | |
| Example 36 | Ethylene glycol<br>Water<br>Ammonium adipate<br>Nitrophenylphenyl ether<br>Hydroxybenzyl alcohol<br>Glutamic-diacetic acid | 57.5<br>20.7<br>15.8<br>1.0<br>2.6<br>2.2 | 84 | 1.0 | 3.6 | 1013 | 7.2 | 6.8 | 944 | 7.8 | 2.2 | |
| Example 37 | Ethylene glycol<br>Water<br>Ammonium adipate<br>Nitrobenzimidazole<br>Ammonium glutarate<br>Glutamic-diacetic acid | 58.8<br>26.4<br>11.3<br>0.5<br>1.5<br>1.5 | 76 | 1.0 | 3.8 | 1015 | 7.1 | 6.9 | 944 | 7.7 | 2.4 | |

TABLE 4-continued

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Example 38 | Ethylene glycol | 39.6 | 46 | 1.0 | 3.6 | 1018 | 6.0 | 6.7 | 937 | 6.6 | 2.6 | |
| | Water | 40.0 | | | | | | | | | | |
| | Ammonium glutarate | 19.0 | | | | | | | | | | |
| | Nitrophenolmethyl ether | 0.4 | | | | | | | | | | |
| | Hydroxybenzyl alcohol | 1.0 | | | | | | | | | | |
| Example 39 | Ethylene glycol | 48.8 | 54 | 1.0 | 3.8 | 1016 | 6.3 | 6.5 | 945 | 6.9 | 2.5 | |
| | Water | 39.3 | | | | | | | | | | |
| | Ammonium adipate | 9.4 | | | | | | | | | | |
| | Sulfamic acid | 0.4 | | | | | | | | | | |
| | Nitrobenzyl alcohol | 1.1 | | | | | | | | | | |
| | Hydroxybenzyl alcohol | 1.0 | | | | | | | | | | |
| Example 40 | Ethylene glycol | 51.2 | 64 | 1.0 | 3.6 | 1016 | 6.6 | 6.7 | 945 | 7.2 | 2.7 | |
| | Water | 30.1 | | | | | | | | | | |
| | Ammonium succinate | 16.2 | | | | | | | | | | |
| | Boric acid | 1.1 | | | | | | | | | | |
| | Nitrophenylaniline | 0.4 | | | | | | | | | | |
| | Glutamic-diacetic acid | 1.0 | | | | | | | | | | |

Examples 41 to 50

The procedure of Example 1 was repeated except that, in these Examples, the compositions of the electrolytic solutions used were changed to those shown together in Table 5 below so as to confirm the effect brought by the simultaneous addition of a nitro or nitroso compound and gluconic lactone. As seen in Table 5, satisfactory test results were obtained. In Table 5 below, test results of Comparative Examples 1 to 4 are also shown.

TABLE 5

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol | 90.0 | 180 | 4.0 | 120.0 | 1002 | 8.5 | 6.5 | 940 | 8.6 | 6.2 | |
| | Water | 5.0 | | | | | | | | | | |
| | Ammonium adipate | 5.0 | | | | | | | | | | |
| Comparative Example 2 | Ethylene glycol | 60.0 | 85 | 1.3 | 36.1 | 1008 | 7.0 | 6.5 | In all samples, the safety vent was actuated in 500 hours due to gas evolution. | | | |
| | Water | 30.0 | | | | | | | | | | |
| | Ammonium adipate | 10.0 | | | | | | | | | | |
| Comparative Example 3 | Ethylene glycol | 45.0 | 40 | 1.1 | 9.7 | 1014 | 5.7 | 6.1 | In all samples, the safety vent was actuated in 250 hours due to gas evolution. | | | |
| | Water | 40.0 | | | | | | | | | | |
| | Ammonium adipate | 15.0 | | | | | | | | | | |
| Comparative Example 4 | Ethylene glycol | 30.0 | 20 | 1.0 | 7.9 | 1023 | 4.7 | 6.9 | In all samples, the safety vent was actuated in 250 hours due to gas evolution. | | | |
| | Water | 50.0 | | | | | | | | | | |
| | Ammonium adipate | 20.0 | | | | | | | | | | |
| Example 41 | Ethylene glycol | 25.0 | 25 | 1.1 | 4.6 | 1033 | 4.8 | 7.8 | 888 | 5.6 | 2.4 | |
| | Water | 68.0 | | | | | | | | | | |
| | Ammonium formate | 5.4 | | | | | | | | | | |
| | Hypophosphorous acid | 0.4 | | | | | | | | | | |
| | Gluconic lactone | 0.2 | | | | | | | | | | |
| | Dinitrobenzaldehyde | 0.5 | | | | | | | | | | |
| | Nitrohydroxyaniline | 0.5 | | | | | | | | | | |
| Example 42 | Ethylene glycol | 22.0 | 28 | 1.1 | 4.4 | 1034 | 5.1 | 7.9 | 900 | 5.9 | 2.6 | |
| | Water | 59.0 | | | | | | | | | | |
| | Ammonium glutarate | 16.2 | | | | | | | | | | |
| | Sulfamic acid | 1.6 | | | | | | | | | | |
| | Gluconic lactone | 0.2 | | | | | | | | | | |
| | Nitrodiphenylamine | 0.5 | | | | | | | | | | |
| | Nitrophenylazo-naphthol | 0.5 | | | | | | | | | | |
| Example 43 | Ethylene glycol | 16.0 | 23 | 1.1 | 4.1 | 1025 | 4.8 | 7.9 | 902 | 5.6 | 2.5 | |
| | Water | 60.0 | | | | | | | | | | |
| | Ammonium adipate | 22.8 | | | | | | | | | | |

TABLE 5-continued

| No. | Composition of Electrolytic Solution | [wt %] | Specific Resistance at 30° C. [Ω · cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Example 44 | Gluconic lactone<br>Nitrophenylaniline<br>Nitrohydroxaniline<br>Ethylene glycol<br>Water<br>Ammonium succinate<br>Benzenesulfonic acid<br>Gluconic lactone<br>Hydroxynitrobenzoic acid | 0.2<br>0.5<br>0.5<br>23.0<br>50.0<br>25.4<br>0.4<br>0.2<br>1.0 | 22 | 1.1 | 4.0 | 1021 | 4.8 | 7.8 | 919 | 5.6 | 2.4 | |
| Example 45 | Ethylene glycol<br>Water<br>Ammonium borate<br>Gluconic lactone<br>Nitrophenylacetic acid | 48.0<br>40.0<br>10.8<br>0.2<br>1.0 | 56 | 1.2 | 4.0 | 1025 | 6.6 | 7.5 | 933 | 7.4 | 2.5 | |
| Example 46 | Ethylene glycol<br>Water<br>Ammonium sulfamate<br>Phosphoric acid<br>Gluconic lactone<br>Nitrosodiphenylamine | 54.0<br>30.0<br>14.4<br>0.4<br>0.2<br>1.0 | 63 | 1.0 | 3.8 | 1016 | 6.8 | 7.1 | 935 | 7.6 | 2.4 | |
| Example 47 | Ethylene glycol<br>Water<br>Ammonium adipate<br>Boric acid<br>Gluconic lactone<br>Nitrophenolmethyl ether | 60.0<br>20.0<br>18.4<br>0.4<br>0.2<br>1.0 | 82 | 1.0 | 3.6 | 1013 | 7.1 | 6.9 | 942 | 7.9 | 2.4 | |
| Example 48 | Ethylene glycol<br>Water<br>Ammonium adipate<br>Gluconic lactone<br>Nitrophthalic acid<br>Nitrophenol | 62.0<br>27.2<br>10.0<br>0.2<br>0.8<br>0.8 | 78 | 1.0 | 3.8 | 1015 | 7.1 | 6.8 | 949 | 7.9 | 2.4 | |
| Example 49 | Ethylene glycol<br>Water<br>Ammonium glutarate<br>Gluconic lactone<br>Nitroaminotoluene | 40.0<br>40.0<br>18.8<br>0.2<br>1.0 | 44 | 1.0 | 3.6 | 1018 | 5.9 | 6.7 | 937 | 6.5 | 2.5 | |
| Example 50 | Ethylene glycol<br>Water<br>Ammonium adipate<br>Sulfamic acid<br>Gluconic lactone<br>Nitrosalicylic acid | 50.0<br>39.6<br>9.2<br>0.4<br>0.2<br>0.6 | 58 | 1.0 | 3.7 | 1013 | 6.4 | 6.9 | 942 | 7.0 | 2.4 | |

Examples 51 to 60

The procedure of Example 1 was repeated except that in these Examples, the compositions of the electrolytic solutions used were changed to those shown together in Table 6 below so as to confirm the effect brought by the arbitrary combination of various additives. As seen in Table 6, satisfactory test results were obtained. In Table 6 below, test results of Comparative Examples 1 to 4 are also shown.

TABLE 6

| No. | Composition of Electrolytic Solution | [wt %] | Specific Resistance at 30° C. [Ω · cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 2 | Ethylene glycol<br>Water<br>Ammonium adipate | 60.0<br>30.0<br>10.0 | 85 | 1.3 | 36.1 | 1008 | 7.0 | 6.5 | In all samples, the safety vent was actuated in 500 hours due to gas evolution. | | | |

TABLE 6-continued

| No. | Composition of Electrolytic Solution | [wt %] | Specific Resistance at 30° C. [Ω · cm] | Z Ratio 120 Hz [−40/ 20° C.] | Z Ratio 100 kHz [−40/ 20° C.] | Initial Value Capacitance (µF) | Initial Value tan δ [%] | Initial Value Leakage Current [µA] | After 2,000 Hours at 105° C. Capacitance [µF] | After 2,000 Hours at 105° C. tan δ [%] | After 2,000 Hours at 105° C. Leakage Current [µA] | Appearance |
|---|---|---|---|---|---|---|---|---|---|---|---|---|
| Comparative Example 3 | Ethylene glycol<br>Water<br>Ammonium adipate | 45.0<br>40.0<br>15.0 | 40 | 1.1 | 9.7 | 1014 | 5.7 | 6.1 | In all samples, the safety vent was actuated in 250 hours due to gas evolution. | | | |
| Comparative Example 4 | Ethylene glycol<br>Water<br>Ammonium adipate | 30.0<br>50.0<br>20.0 | 20 | 1.0 | 7.9 | 1023 | 4.7 | 6.9 | In all samples, the safety vent was actuated in 250 hours due to gas evolution. | | | |
| Example 51 | Ethylene glycol<br>Water<br>Ammonium formate<br>Hypophosphorous acid<br>Ethylenediamine-tetraacetic acid<br>Glutamic-diacetic acid<br>Gluconic lactone<br>Nitrobenzyl alcohol<br>Nitromethoxyaniline | 24.3<br>67.9<br>5.0<br>0.4<br>0.5<br>0.2<br>0.2<br>1.0<br>0.5 | 24 | 1.1 | 4.6 | 1044 | 4.8 | 7.7 | 898 | 5.6 | 2.4 | |
| Example 52 | Ethylene glycol<br>Water<br>Ammonium glutarate<br>Sulfamic acid<br>Diethylenetriamine-pentaacetic acid<br>Fructose<br>Gluconic lactone<br>Methoxynitroaniline<br>Hydroxynitrotoluene | 18.0<br>60.0<br>17.0<br>1.6<br>1.0<br>1.0<br>0.2<br>0.6<br>0.6 | 27 | 1.1 | 4.4 | 1034 | 5.0 | 7.8 | 900 | 5.8 | 2.5 | |
| Example 53 | Ethylene glycol<br>Water<br>Ammonium adipate<br>Ethylenediamine-tetraacetic acid<br>Hydroxybenzyl alcohol<br>Gluconic lactone<br>Methoxynitrobenzoic acid<br>Nitrotoluidine | 15.0<br>58.1<br>23.0<br>2.0<br>0.5<br>0.2<br>0.6<br>0.6 | 23 | 1.1 | 4.3 | 1025 | 4.8 | 7.9 | 902 | 5.6 | 2.4 | |
| Example 54 | Ethylene glycol<br>Water<br>Ammonium succinate<br>Ethylenediamine-diacetic acid<br>Glutamic-diacetic acid<br>Benzenesulfonic acid<br>Gluconic lactone<br>Nitrobenzophenone | 20.6<br>50.6<br>26.2<br>1.0<br>0.2<br>0.4<br>0.2<br>0.8 | 28 | 1.1 | 4.1 | 1020 | 5.0 | 7.5 | 918 | 5.8 | 2.6 | |
| Example 55 | Ethylene glycol<br>Water<br>Ammonium borate<br>Ethylenediamine-diacetic acid<br>Hydroxybenzyl alcohol<br>Gluconic lactone<br>Nitrobenzenesulfonic acid | 46.7<br>40.4<br>10.8<br>0.8<br>0.5<br>0.2<br>0.6 | 56 | 1.2 | 4.0 | 1024 | 6.6 | 7.6 | 932 | 7.4 | 2.5 | |
| Example 56 | Ethylene glycol<br>Water<br>Ammonium sulfamate<br>Xylose<br>EDTPO<br>Glutamic-diacetic acid<br>Phosphoric acid<br>Gluconic lactone<br>Nitroethylbenzene | 52.0<br>30.4<br>14.4<br>0.5<br>1.0<br>0.5<br>0.4<br>0.2<br>0.6 | 66 | 1.0 | 3.7 | 1020 | 6.9 | 7.5 | 938 | 7.7 | 2.6 | |
| Example 57 | Ethylene glycol<br>Water<br>Ammonium adipate<br>Ethylenediamine-tetraacetic acid | 58.0<br>19.5<br>18.4<br>1.5 | 85 | 1.0 | 3.6 | 1013 | 7.1 | 7.0 | 942 | 7.9 | 2.4 | |

TABLE 6-continued

| No. | Composition of Electrolytic Solution | [wt %] | Specific Resistance at 30° C. [Ω · cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 2,000 Hours at 105° C. Capacitance [μF] | After 2,000 Hours at 105° C. tan δ [%] | After 2,000 Hours at 105° C. Leakage Current [μA] | Appearance |
|---|---|---|---|---|---|---|---|---|---|---|---|---|
| | Hydroxybenzyl alcohol | 0.5 | | | | | | | | | | |
| | Glutamic-diacetic acid | 0.5 | | | | | | | | | | |
| | Boric acid | 0.4 | | | | | | | | | | |
| | Gluconic lactone | 0.2 | | | | | | | | | | |
| | Methoxynitrophenol | 1.0 | | | | | | | | | | |
| Example 58 | Ethylene glycol | 57.5 | 75 | 1.0 | 3.8 | 1015 | 7.0 | 7.2 | 949 | 7.8 | 2.6 | |
| | Water | 27.8 | | | | | | | | | | |
| | Ammonium adipate | 8.8 | | | | | | | | | | |
| | Diethylenetriamine-pentaacetic acid | 3.0 | | | | | | | | | | |
| | Glucose | 1.0 | | | | | | | | | | |
| | Hydroxybenzyl alcohol | 0.5 | | | | | | | | | | |
| | Gluconic lactone | 0.2 | | | | | | | | | | |
| | Nitrothiophene | 0.6 | | | | | | | | | | |
| | Nitrosodiphenylamine | 0.6 | | | | | | | | | | |
| Example 59 | Ethylene glycol | 47.5 | 58 | 1.0 | 3.7 | 1015 | 6.1 | 7.0 | 944 | 6.7 | 2.6 | |
| | Water | 39.8 | | | | | | | | | | |
| | Ammonium adipate | 9.0 | | | | | | | | | | |
| | Hydroxybenzyl alcohol | 1.0 | | | | | | | | | | |
| | EDTPO | 1.0 | | | | | | | | | | |
| | Fructose | 0.5 | | | | | | | | | | |
| | Sulfamic acid | 0.4 | | | | | | | | | | |
| | Gluconic lactone | 0.2 | | | | | | | | | | |
| | Diethyl nitrophenyl-phosphate | 0.6 | | | | | | | | | | |
| Example 60 | Ethylene glycol | 50.0 | 67 | 1.0 | 3.6 | 1018 | 6.5 | 6.9 | 947 | 7.1 | 2.6 | |
| | Water | 29.6 | | | | | | | | | | |
| | Ammonium succinate | 16.0 | | | | | | | | | | |
| | Xylose | 0.5 | | | | | | | | | | |
| | Ethylenediamine-tetraacetic acid | 2.0 | | | | | | | | | | |
| | Hydroxybenzyl alcohol | 0.5 | | | | | | | | | | |
| | Gluconic lactone | 0.2 | | | | | | | | | | |
| | Nitrophenylaceto-nitrile | 0.6 | | | | | | | | | | |
| | Hydroxynitrobenz-aldehyde | 0.6 | | | | | | | | | | |

Examples 61 to 70

The procedure of Example 1 was repeated except that in these Examples, the conditions for the measurement of capacitor properties by a high-temperature load test at 105° C. while applying a rated voltage employed in Example 1 were changed to the passing of 8,000 hours at 105° C. so as to confirm an improvement in the working life property. The results obtained are shown in Table 7 below.

TABLE 7

| No. | Composition of Electrolytic Solution | [wt %] | Specific Resistance at 30° C. [Ω · cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 8,000 Hours at 105° C. Capacitance [μF] | After 8,000 Hours at 105° C. tan δ [%] | After 8,000 Hours at 105° C. Leakage Current [μA] | Appearance |
|---|---|---|---|---|---|---|---|---|---|---|---|---|
| Comparative Example 1 | Ethylene glycol | 90.0 | 180 | 4.0 | 120.0 | 1002 | 8.5 | 6.5 | 940 | 8.6 | 6.2 | |
| | Water | 5.0 | | | | | | | | | | |
| | Ammonium adipate | 5.0 | | | | | | | | | | |
| Comparative Example 2 | Ethylene glycol | 60.0 | 85 | 1.3 | 36.1 | 1008 | 7.0 | 6.5 | In all samples, the safety vent was actuated in 500 hours due to gas evolution. | | | |
| | Water | 30.0 | | | | | | | | | | |
| | Ammonium adipate | 10.0 | | | | | | | | | | |
| Comparative Example 3 | Ethylene glycol | 45.0 | 40 | 1.1 | 9.7 | 1014 | 5.7 | 6.1 | In all samples, the safety vent was actuated in 250 hours due to gas evolution. | | | |
| | Water | 40.0 | | | | | | | | | | |
| | Ammonium adipate | 15.0 | | | | | | | | | | |

TABLE 7-continued

| No. | Composition of Electrolytic Solution | [wt %] | Specific Resistance at 30° C. [Ω·cm] | Z Ratio 120 Hz [−40/ 20° C.] | Z Ratio 100 kHz [−40/ 20° C.] | Initial Value Capacitance (μF) | Initial Value tan δ [%] | Initial Value Leakage Current [μA] | After 8,000 Hours at 105° C. Capacitance [μF] | After 8,000 Hours at 105° C. tan δ [%] | After 8,000 Hours at 105° C. Leakage Current [μA] | Appearance |
|---|---|---|---|---|---|---|---|---|---|---|---|---|
| Comparative Example 4 | Ethylene glycol<br>Water<br>Ammonium adipate | 30.0<br>50.0<br>20.0 | 20 | 1.0 | 7.9 | 1023 | 4.7 | 6.9 | colspan=3: In all samples, the safety vent was actuated in 250 hours due to gas evolution. | | | |
| Example 61 | Ethylene glycol<br>Water<br>Ammonium formate<br>Hypophosphorous acid<br>Nitrophenol<br>Dinitrodiphenylamine | 25.0<br>68.0<br>4.6<br>0.4<br>1.0<br>1.0 | 28 | 1.1 | 4.5 | 1027 | 5.3 | 8.2 | 812 | 6.5 | 2.2 | |
| Example 62 | Ethylene glycol<br>Water<br>Ammonium glutarate<br>Sulfamic acide<br>Diaminonitrobenzene<br>Dinitrophthalic acid | 20.0<br>60.0<br>18.0<br>1.4<br>0.3<br>0.3 | 27 | 1.1 | 4.3 | 1040 | 5.4 | 8.4 | 820 | 6.8 | 2.8 | |
| Example 63 | Ethylene glycol<br>Water<br>Ammonium adipate<br>Phosphorous acid<br>Nitroaminothiazole<br>Aminonitroanisole | 15.0<br>60.0<br>23.0<br>1.0<br>0.4<br>0.6 | 26 | 1.1 | 4.8 | 1038 | 5.3 | 8.1 | 815 | 6.3 | 2.5 | |
| Example 64 | Ethylene glycol<br>Water<br>Ammonium formate<br>Succinic acid<br>Dithiobisnitro-<br>benzoic acid | 25.0<br>50.0<br>23.6<br>0.4<br>1.0 | 30 | 1.1 | 4.3 | 1021 | 5.2 | 8.0 | In all samples, the safety vent was actuated in 3,000 hours due to gas evolution. | | | |
| Example 65 | Ethylene glycol<br>Water<br>Ammonium sulfamate<br>Nitrosophenylaniline | 55.0<br>28.0<br>16.0<br>1.0 | 40 | 1.0 | 3.7 | 1011 | 6.4 | 7.9 | In all samples, the safety vent was actuated in 3,000 hours due to gas evolution. | | | |
| Example 66 | Ethylene glycol<br>Water<br>Ammonium adipate<br>Acetic acid<br>Aminonitrophenol | 59.0<br>20.0<br>19.0<br>0.6<br>1.4 | 72 | 1.0 | 3.9 | 1002 | 6.7 | 7.8 | In all samples, the safety vent was actuated in 4,000 hours due to gas evolution. | | | |
| Example 67 | Ethylene glycol<br>Water<br>Ammonium glutarate<br>Aminonitrophenol-<br>sulfonic acid | 62.0<br>27.0<br>10.0<br>1.0 | 64 | 1.0 | 3.8 | 1007 | 6.5 | 7.9 | In all samples, the safety vent was actuated in 5,000 hours due to gas evolution. | | | |
| Example 68 | Ethylene glycol<br>Water<br>Ammonium adipate<br>phosphoric acid<br>Nitrobenzoic acid<br>Nitroaminophenol | 38.8<br>40.0<br>20.0<br>0.2<br>0.7<br>0.9 | 46 | 1.0 | 3.6 | 1018 | 6.0 | 8.1 | 809 | 7.1 | 2.3 | |
| Example 69 | Ethylene glycol<br>Water<br>Ammonium glutarate<br>Ethyl nitrobenzoate | 50.0<br>40.0<br>1.3<br>0.6 | 68 | 1.0 | 3.7 | 1014 | 6.4 | 6.2 | In all samples, the safety vent was actuated in 4,000 hours due to gas evolution. | | | |
| Example 70 | Ethylene glycol<br>Water<br>Ammonium adipate<br>Hypophosphorous acid<br>Aminonitrobenzo-<br>nitrile | 40.0<br>50.2<br>8.0<br>0.8<br>1.0 | 53 | 1.0 | 3.7 | 1019 | 6.1 | 7.8 | 813 | 7.0 | 2.6 | |

As can be seen from the results shown in Table 7 above, in Comparative Examples 2 to 4 using an electrolytic solution containing 20 wt % or more of water in the solvent and not containing a nitro or nitroso compound, all capacitors broke down between 250 and 500 hours. In Examples 64, 65, 67 and 69, the capacitors showed abnormality in the properties in 3,000 to 5,000 hours. On the other hand, in Examples 61, 62, 63, 68 and 70, the capacitors maintained very good properties even after the passage of 8,000 hours. Furthermore, it is noticeable that the working life property of the electrolytic capacitor was improved by using a carboxylic acid or a salt thereof as the organic electrolyte and an inorganic acid as the inorganic electrolyte in combination.

Examples 71 to 75 and Comparative Examples 5 to 10

Using the capacitor element used in Example 1, capacitors were manufactured. Capacitors for comparison were manufactured using an electrolytic solution not containing a nitro or nitroso compound and capacitors of 10 wv-1,000 μF were manufactured using a capacitor element where a predetermined amount of a solvent-soluble nitro or nitroso compound was attached to the separator of the electrolytic capacitor element and, similarly to the capacitors for comparison, using an electrolytic solution not containing a nitro or nitroso compound. These capacitors were subjected to a load test at 105° C. As for the means for attaching a nitro or nitroso compound to the separator, a method of preparing a water/alcohol solution containing from 1 to 5 wt % of a nitro or nitroso compound and directly spraying a constant amount of the solution by an atomizer at the time of taking up the capacitor element, to attach the nitro or nitroso compound, was employed. The amount attached was confirmed by measuring the weight and set to an amount more than the minimum amount effective when the nitro or nitroso compound is contained in the electrolytic solution.

The results are shown in Table 8.

In Comparative Examples, all capacitors were broken down before 500 hours, whereas capacitors using a separator attached with a nitro or nitroso compound exhibited very good properties even after the passage of 1,000 hours.

Examples 76 to 80

Electrolytic capacitors as Comparative Examples were manufactured using an electrolytic solution not containing a nitro or nitroso compound and capacitors of 10 wv-1,000 μF were manufactured using a capacitor element where a predetermined amount of a solvent-soluble nitro or nitroso compound was coated on the-electrode foil of the electrolytic capacitor element and using the same electrolytic solution as in Comparative Examples. These capacitors were subjected

TABLE 8

| No. | Composition of Electrolytic Solution, Separator Constituting Capacitor Element | [wt %] | Specific Resistance at 30° C. [Ω·cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 1,000 Hours at 105° C. Capacitance [μF] | After 1,000 Hours at 105° C. tan δ [%] | After 1,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 5 | Ethylene glycol<br>Water<br>Ammonium adipate<br>Normal separator | 60.0<br>30.0<br>10.0 | 40 | 1.3 | 36.1 | 1011 | 7.1 | 6.6 | In all samples, the safety vent was actuated in 500 hours due to gas evolution. | | | |
| Comparative Example 6 | Ethylene glycol<br>Water<br>Ammonium sulfamate<br>Normal separator | 45.0<br>40.0<br>15.0 | 20 | 1.1 | 9.7 | 1016 | 5.8 | 6.2 | In all samples, the safety vent was actuated in 250 hours due to gas evolution. | | | |
| Comparative Example 7 | Ethylene glycol<br>Water<br>Ammonium adipate<br>Normal separator | 30.0<br>50.0<br>20.0 | 20 | 1.0 | 7.9 | 1024 | 4.8 | 6.8 | In all samples, the safety vent was actuated in 250 hours due to gas evolution. | | | |
| Example 71 | Ethylene glycol<br>Water<br>Ammonium adipate<br>Dinitrobenzoic acid-coated separator | 60.0<br>30.0<br>10.0 | 85 | 1.3 | 36.1 | 1013 | 7.2 | 6.8 | 907 | 7.9 | 2.9 | |
| Example 72 | Ethylene glycol<br>Water<br>Ammonium Sulfamate<br>Hydroxynitrobenzoic acid-coated separator | 45.0<br>40.0<br>15.0 | 20 | 1.1 | 9.7 | 1015 | 5.9 | 6.5 | 903 | 6.5 | 2.9 | |
| Example 73 | Ethylene glycol<br>Water<br>Ammonium adipate<br>Trinitrophenol-coated separator | 30.0<br>50.0<br>20.0 | 20 | 1.0 | 7.9 | 1021 | 4.7 | 6.7 | 909 | 5.3 | 2.9 | |
| Example 74 | Ethylene glycol<br>Water<br>Ammonium adipate<br>Nitrosodimethyl-amine-coated separator | 45.0<br>40.0<br>15.0 | 40 | 1.1 | 9.7 | 1015 | 5.9 | 6.5 | 903 | 6.5 | 2.9 | |
| Example 75 | Ethylene glycol<br>Water<br>Ammonium adipate<br>Nitroquinoline-coated separator | 30.0<br>50.0<br>20.0 | 20 | 1.0 | 7.9 | 1021 | 4.7 | 6.7 | 909 | 5.3 | 2.9 | | to a load test at 105° C. As for the means for coating a nitro or nitroso compound to the electrode foil surface, a water/alcohol solution containing from 1 to 5 wt % of a nitro or nitroso compound was prepared and an operation of dipping an electrode foil previously cut into a belt form in a solution having dissolved therein a nitro or nitroso compound was repeated to attach a predetermined amount of nitro or nitroso compound. Also, similarly to the separator, coating by spraying was attempted. The amount attached was confirmed by measuring the weight and set to an amount more than the minimum amount effective when the nitro or nitroso compound is contained in the electrolytic solution.

The results are shown in Table 9.

While the present invention is described by referring to various suitable Examples, needless to say, the present invention is not limited to these Examples and contents in the claims and various changes and modifications can be made therein without departing from the spirit and scope of the invention. For example, although a coil-shape capacitor element is used in Examples, a stacked layer-type capacitor element can also be used in the same manner.

INDUSTRIAL APPLICABILITY

According to the present invention, there is provided an electrolytic solution for driving an electrolytic capacitor,

TABLE 9

| No. | Composition of Electrolytic Solution, form of electrode foil | [wt %] | Specific Resistance at 30° C. [Ω·cm] | Z Ratio 120 Hz [−40/20° C.] | Z Ratio 100 kHz [−40/20° C.] | Initial Value Capacitance (μF) | Initial Value tan δ [%] | Initial Value Leakage Current [μA] | After 1,000 Hours at 105° C. Capacitance [μF] | After 1,000 Hours at 105° C. tan δ [%] | After 1,000 Hours at 105° C. Leakage Current [μA] | Appearance |
|---|---|---|---|---|---|---|---|---|---|---|---|---|
| Comparative Example 1 | Ethylene glycol<br>Water<br>Ammonium adipate | 90.0<br>5.0<br>5.0 | 180 | 4.0 | 120.0 | 1002 | 8.5 | 6.5 | 940 | 8.6 | 6.2 | |
| Comparative Example 8 | Ethylene glycol<br>Water<br>Ammonium adipate<br>Normal anode foil | 60.0<br>30.0<br>10.0 | 40 | 1.3 | 36.1 | 1011 | 7.1 | 6.6 | In all samples, the safety vent was actuated in 500 hours due to gas evolution. | | | |
| Comparative Example 9 | Ethylene glycol<br>Water<br>Ammonium sulfamate<br>Normal anode foil | 45.0<br>40.0<br>15.0 | 20 | 1.1 | 9.7 | 1016 | 5.8 | 6.2 | In all samples, the safety vent was actuated in 250 hours due to gas evolution. | | | |
| Comparative Example 10 | Ethylene glycol<br>Water<br>Ammonium adipate<br>Normal cathode foil | 30.0<br>50.0<br>20.0 | 20 | 1.0 | 7.9 | 1024 | 4.8 | 6.8 | In all samples, the safety vent was actuated in 250 hours due to gas evolution. | | | |
| Example 76 | Ethylene glycol<br>Water<br>Ammonium adipate<br>Dinitrobenzoic acid-coated anode foil | 60.0<br>30.0<br>10.0 | 40 | 1.1 | 9.7 | 1012 | 5.8 | 6.5 | 901 | 6.4 | 2.9 | |
| Example 77 | Ethylene glycol<br>Water<br>Ammonium Sulfamate<br>Hydroxynitrobenzoic acid-coated cathode foil | 45.0<br>40.0<br>15.0 | 20 | 1.1 | 6.4 | 1010 | 4.2 | 6.5 | 899 | 4.8 | 3.1 | |
| Example 78 | Ethylene glycol<br>Water<br>Ammonium adipate<br>Nitrosodimethylamine-coated cathode foil | 30.0<br>50.0<br>20.0 | 20 | 1.2 | 8.5 | 1015 | 4.8 | 7 | 900 | 5.3 | 3.5 | |
| Example 79 | Ethylene glycol<br>Water<br>Ammonium adipate<br>Trinitrophenol-coated cathode foil | 30.0<br>50.0<br>20.0 | 20 | 1.0 | 7.9 | 1020 | 4.8 | 6.8 | 908 | 5.4 | 3.2 | |
| Example 80 | Ethylene glycol<br>Water<br>Ammonium adipate<br>Nitroquinoline-coated anode foil | 30.0<br>50.0<br>20.0 | 20 | 1.0 | 7.9 | 1019 | 4.8 | 6.7 | 907 | 5.4 | 3.0 | |

In Comparative Examples, all capacitors were broken down before 500 hours, whereas capacitors using an electrode foil coated with a nitro or nitroso compound exhibited very good properties even after the passage of 1,000 hours.

These results reveal that even if a nitro or nitroso compound is not present in the electrolytic solution, when a nitro or nitroso compound is present in the capacitor element, the working life is greatly improved.

which ensures a low impedance, excellent low-temperature stability represented by the impedance ratio between low temperature and ordinary temperature, and good working life and can exert an excellent hydrogen gas absorbing effect even when an electrolytic solution using a solvent having a large water content ratio is used or the electrolytic capacitor is used in a high-temperature environment. Furthermore, according to the present invention, there is provided an electrolytic capacitor, particularly, an aluminum electrolytic capacitor using this electrolytic solution, which has a low impedance, an excellent low-temperature stability, good working life property and high reliability and is free of failure ascribable to the action of water used in the solvent. In addition, the latitude in the type and presence of the nitro or nitroso compound as the compound added to achieve these purposes is widened and the utilization thereof is expanded.

The invention claimed is:

1. An electrolytic capacitor using an electrolytic solution constituted by a solvent consisting of from 20 to 80 wt % of an organic solvent and from 80 to 20 wt % of water, the electrolytic capacitor comprising a nitro or nitroso compound disposed on a portion inside the capacitor and not in the electrolytic solution, the nitro or nitroso compound being selected from the group consisting of aminonitroanisole, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)-ethanamine, O-ethyl-O-(p-nitrophenyl) thionobenzene, ethylnitrobenzene, ethyl-2-(hydroxyimino)-5-nitro-3-hexeneamide, octanitrobenzoylsaccharose, nitrophenyloctyl ether, nitrophenyl galactopyranoside, 3-carboxy-4-nitrophe nyl disulfide, bisnitrobenzylfluorescein, glycerol carbonatenitrobenzene sulfonate, glutamyl nitroanilide, nitrophenyl acetate, nitrobenzylidene acetate, diaminonitrobenzene, dithiobisnitrobenzoic acid, dithiobisnitropyridine, dinitroaniline, dinitroquinoxaline-2,3-dione, dinitrosalicylic acid, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzald ehyde, d initrobenzoylmethylbenzylamine, dinitrobenzophenone, nitroaminothiazole, dimethylnitroaniline, dimethylnitrophenylphosphorothioate, dimethoxynitrobenzyl alcohol, bisdinitrophenyl oxalate, succinimidyl nitrophenylacetate, tetranitrophenyl porphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazinemaleic acid, nitrocresol, nitrocinnamic acid nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphihol, nitrophenylazomethylresorcinol, nitrophenylaniline, nitrophenyloctyl ether, nitrophenylgalactopyranoside, nitrophenyixylopyranoside, nitrophenylgiucuronide, nitrophenyiglucopyranoside, nitrophenylacetic acid, nitrophenyldodecyl ether, nitrophenylarsonic acid, nitrophenyihydrazine, nitrophenyiphenylazophenyl triazene, nitrophenyiphenyl ether, nitrophenylmaltopentaoside, nitrophenylmannopyranoside, nitrophenylbutyric acid, diethyl nitrophenyiphosphate, nitrophenylenediamine, nitrophenethole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridme, nitrobenzamide, nitrobenzimidazole, nitrobenzohydrazide, nitrobenzeazoorcinol, nitrobenzeneazonaphthol, nitromethane, nitroethane, nitrobenzeneazoresorcinol, nitrobe nzenesulfonic acid, nitrobenzocoumarin, nitrobenzonitrile, nitrobenzophenone, nitromesitylene, nitromethoxyaniline, bisnitrophenyl disulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, 3-[2-hydroxy-1-(1-methylethyl )-2-nitrosohydrazino]-1-propanonamine, phenylnitroaniline, 2-(2-furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitroso oxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenyihydroxylamine ammonium, nitrosophenol N-[(N-nitrosomethylamino)methyl]benzamide, 2,2-(hydroxynitrosohydrazono)bisethanamine, N-methyl-2-(1-ethyl-2-hydroxy-2-nitrosohydrazino)-ethananline, N,N-dinitroso-p-phenylenediamine, N,N-dinitrosopentamethylenetetramine, dimethylnitrosoaniline, dimethylnitrosoamine, nitrosonium tetrafluoroborate, N-[N'-methyl-N-nitroso(aminomethyl)]benzamide, N-methyl-N-nitroso-p-toluenesulfonamide, dinitrobenzene, dinitrotoluene, nitronaphthalene, dinitronaphthalene, dinitrobiphenyl, dimethylnitrotoluene, dinitropyrene, nitrobenzoic acid ester, dimethylnitrobenzene, nitroanthracene, nitroisoquinoline, nitroxylene, ethyl nitroacetate, nitrocyclopentane, nitrostyrene, nitropyrrole, nitrofurazone, nitrofuraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene, fluoronitrodiphenyl ether, trinitroacetonitrile, trinitroaniline, trinitrobenzoic acid, trinitroethane, trinitroxylene, trinitrotoluene, trinitronaphthalene, trinitrofluorenone, trinitrobenzene, trinitromesitylene, trinitromethane, trinitroresorcinol, dinitroacetanilide, dinitroanisole, dinitroanthraquinone, dinitroethane, dinitroethanediamine, dinitrocarbanilide, dinitroxylene, dinitroglycerol, dinitrocresol, dinitronaphthol, dinitrophenyl, dinitrophenyihydrazone, dinitromethane, dinitroresorcinol, nitroamide, nitroanthraquinone, nitroisophthalic acid, nitroethylene, ethyl nitrocarbamate, nitroquinaldic acid, nitroguanidine, nitroglycol, nitroglycerin, nitrodimethylamine, nitrocamphor, methylnitropropane, nitrosulfathiazole, nitrocellulose, nitrosomethane, nitrosoguanidine, nitrosodimethylaniline, nitrosotoluene, nitrosodisulfonic acid, nitrosopiperidine, nitrosobenzene, nitrosomethylurea, nitronaphthylamine, nitronaphthol, nitropyridine, nitrophenanthrene, nitrophenylpropiolic acid, nitrophenetidine, nitrophenolsulfonic acid, nitropentane, nitroresorcinol, nitrourea, trinitroxylenol, trinitrodiphenyl ether, trinitrotriazidobenzene, trinitrophloroglucinol, nitroacridine, nitroacridone, nitroacetone, nitroanilic acid, nitroaminoacetic acid, nitroisatin, nitroisobutane, nitroindene, nitrourethane, nitrocarbostyril, nitrodiglycol, nitro-p-cymene, nitrocinnamaldehyde, N-nitrosoacetanilide, nitrosoanisidine, nitrosoaniline, nitrosobenzoic acid, nitrosoanthranilic acid, nitrosocatechol, nitrosocarvacrol, nitrosocresol, nitrosonaphthylamine, nitrothioanisole, nitrothiophenol, nitronaphthalenesulfonic acid, nitronaphthylamine, nitronaphthoic acid, nitronitrosobenzene, nitrohydroquinone, nitropyrogallol, nitrophenanthridme, nitrophenanthroline, nitrophenylurethane, nitrophenylurea, nitrobutane, nitrophthalide, nitrofuran, nitropropylene, nitrophloroglucinol, nitrobenzanilide, nitrobenzaldoxime, nitrobenzoylformic acid, nitrobenzimidazole, nitromalonic acid, nitromalondialdehyde, nitromandelic acid, nitromannitol, nitromethylnaphthalene, nitromalic acid, nitroresorcinol, nitron, nitrosoresorcinol, aminonitropyrimidine, trinitrofluorenylidene malononitrile, nitrofluoranthene, nitrobenzocrown, fluoronitrobenzofurazan, methylnitronitrosoguanidine, methylnitronitrophenylpyrazolone, nitrofluorene, nitropropane, nitropropoxyaniline, trinitroanisole, trinitrocresol, trinitrobenzaldehyde, nitrodiethylaniline, nitrostilbene, nitrosonaphthalene, nitrosobenzaldehyde, nitrosomethylurethane, nitrophenylhydrazone, dinitrotartaric acid, dinitrostilbene, dinitrosoresorcinol, dinitrohydroquinone, dinitroresorcinol, nitroquinoline, dinitrosophenol, trinitrosophenol, dinitrosobenzoic acid, trinitrosobenzoic acid, dinitroacetophenone, trinitroacetophenone, nitrosoacetophenone, dinitrosoacetophenone, trinitrosoacetophenone, nitrosoanisole, dinitrosoanisole, trinitrosoanisole or an isomer, salt, derivative, coordinate bonded form or clathrate form thereof.

2. The electrolytic capacitor according to claim 1, which comprises the nitro or nitroso compound or an isomer, salt or derivative thereof on the electrode surface.

3. The electrolytic capacitor according to claim 1, wherein the nitro or nitroso compound or an isomer, salt or derivative thereof is attached or impregnated to an electrode surface by the coating or by the dipping in a solution having dissolved therein the nitro or nitroso compound or an isomer, salt or derivative thereof.

4. The electrolytic capacitor according to claim 1, wherein the nitro or nitroso compound or an isomer, salt or derivative thereof is contained in a separator constituting the electrolytic capacitor.

5. The electrolytic capacitor according to claim 1, wherein the nitro or nitroso compound or an isomer, salt or derivative thereof is attached or dipped to a separator by coating or by dipping in a solution having dissolved therein the nitro or nitroso compound or an isomer, salt or derivative thereof.

6. The electrolytic capacitor according to claim 1, wherein the amount of the nitro or nitroso compound or an isomer, salt or derivative thereof contained in an electrode foil is from 0.007 to 1 mg/cm$^2$ (projectional area).

7. The electrolytic capacitor according to claim 1, wherein the amount of the nitro or nitroso compound or an isomer, salt or derivative thereof contained in a separator is from 0.007 to 1 mg/cm$^2$ (projectional area).

8. The electrolytic capacitor according to claim 1, wherein the solvent consists of from 20 to 55 wt % of an organic solvent and from 80 to 45 wt % of water.

9. The electrolytic capacitor according to claim 8, wherein the solvent consists of from 20 to 35 wt % of an organic solvent and from 80 to 65 wt % of water.

10. The electrolytic capacitor according to claim 4, wherein the amount of the nitro or nitroso compound or an isomer, salt or derivative thereof contained in the separator is from 0.007 to 1 mg/cm$^2$ (projectional area).

11. The electrolytic capacitor according to claim 5, wherein the amount of the nitro or nitroso compound or an isomer, salt or derivative thereof contained in the separator is from 0.007 to 1 mg/cm$^2$ (projectional area).

12. The electrolytic capacitor according to claim 1, which comprises the nitro or nitroso compound or an isomer, salt or derivative thereof on an electrode surface.

13. The electrolytic capacitor according to claim 1, wherein the nitro or nitroso compound or an isomer, salt or derivative thereof is attached or impregnated to an electrode surface by the coating or by the dipping in a solution having dissolved therein the nitro or nitroso compound or an isomer, salt or derivative thereof.

14. The electrolytic capacitor according to claim 1, wherein the nitro or nitroso compound or an isomer, salt or derivative thereof is contained in a separator constituting the electrolytic capacitor.

15. The electrolytic capacitor according to claim 1, wherein the nitro or nitroso compound or an isomer, salt or derivative thereof is attached or dipped to a separator by coating or by dipping in a solution having dissolved therein the nitro or nitroso compound or an isomer, salt or derivative thereof.

16. The electrolytic capacitor according to claim 1, wherein the amount of the nitro or nitroso compound or an isomer, salt or derivative thereof contained in an electrode foil is from 0.007 to 1 mg/cm$^2$ (projectional area).

17. The electrolytic capacitor according to claim 1, wherein the amount of the nitro or nitroso compound or an isomer, salt or derivative thereof contained in a separator is from 0.007 to 1 mg/cm (projectional area).

18. The electrolytic capacitor according to claim 1, wherein the solvent consists of from 20 to 55 wt % of an organic solvent and from 80 to 45 wt % of water.

19. The electrolytic capacitor according to claim 18, wherein the solvent consists of from 20 to 35 wt % of an organic solvent and from 80 to 65 wt % of water.

* * * * *